United States Patent [19]
Cheng

[11] 3,737,119
[45] June 5, 1973

[54] DEVICE FOR SONIC BOOM REDUCTION AND IMPROVING AIRCRAFT PERFORMANCE

[75] Inventor: Sin-I Cheng, Princeton, N.J.
[73] Assignee: Research Corporation, New York, N.Y.
[22] Filed: June 15, 1970
[21] Appl. No.: 46,293

[52] U.S. Cl. ..................................244/1 N, 244/55
[51] Int. Cl. ..............................................B64c 21/00
[58] Field of Search ......................244/1 N, 53 R, 54, 244/55; 181/33 H, 33 HB, 33 HC

[56] References Cited
UNITED STATES PATENTS

| | | | |
|---|---|---|---|
| 3,510,095 | 5/1970 | Chuan | 244/130 |
| 3,596,852 | 8/1971 | Wakefield | 244/1 N |

*Primary Examiner*—Duane E. Reger
*Assistant Examiner*—Barry L. Kelmachter
*Attorney*—Henry T. Burke, Robert S. Dunham, P. E. Henninger, Lester W. Clark, Gerald W. Griffin, Thomas F. Moran, Howard J. Churchill, R. Bradlee Boal, Christopher C. Dunham and Thomas P. Dowd

[57] ABSTRACT

Method and means for improving the performance of, and particularly for reducing the sonic boom produced by a supersonic aircraft, comprising the production of a jet stream of approximately equal pressure but higher Mach number than the ambient supersonic flow, which steam is directed below the wing leading edge to intercept and interact with the wing shock wave. The interaction weakens the wing shock and decreases its propagation velocity, so that the wing shock, which normally reinforces the leading nose shock at the ground, will be shifted aftward spatially and in time in the boom signature, and will be delayed in its arrival with respect to the leading nose shock at any fixed position on the ground. By thus altering the signature, both the peak overpressure and the positive impulse of the boom may be substantially reduced without affecting the lift in support of the aircraft. Indeed, proper use of the stream will increase the lift on the aircraft, permitting some decrease in the angle of attack in maintaining level flight, which further weakens the wing shock to add to the altering of the boom signature. Also, the increase in lift, occurring largely on the aft part of the wing, results in reduction in drag, aftward shift of the center of pressure, and increase in the aerodynamic efficiency factor or lift-to-drag ratio, so that the jet stream can be used to improve various aspects of aircraft performance. Supersonic aircraft equipped with the antiboom means, and a particular feasible means for producing the antiboom jet using existing technology are described, along with particular alternatives for the manner of incorporating the means on existing supersonic transports.

50 Claims, 36 Drawing Figures

DEVICE FOR SONIC BOOM REDUCTION AND IMPROVING AIRCRAFT PERFORMANCE

BACKGROUND OF THE INVENTION

The present invention relates to supersonic aircraft and more particularly to a method and means for reducing the sonic boom associated therewith, and for improving the flight characteristics.

With the advent of supersonic flight, to the many conventional problems of aircraft designers, such as structural strength, lift-to-drag considerations, etc., was added the problem of sonic boom. Sonic boom refers to the pressure disturbances created at large distances from an aircraft by the shock waves associated with the aircraft in supersonic flight. More particularly, when an aircraft flies supersonically through the quiescent air, the air molecules do not receive any signal or warning to yield the space they occupy to the oncoming aircraft. The air molecules struck by the aircraft are suddenly displaced, piled up on the leading surfaces and then forced to move over the surface contours of the aircraft. The sudden piling up of these air molecules creates regions of sudden increase of air density, temperature and pressure about the aircraft, which regions are outwardly bounded by what are technically called shockwaves. The highly compressed air in these regions tends to expand and compress the surrounding air resulting, in time, in the propagation of the shock waves into the surrounding quiescent atmosphere at a speed somewhat greater than the speed of sound but still lagging behind the aircraft which created them. Also, as the aircraft passes, the compressed air over-expands along any decreasing transverse sections of the various elements of the aircraft surface and the over-expanded air from the top and the bottom surfaces of each element impinge upon each other, producing trailing shocks in the process of becoming realigned. This multitude of shock waves propagates away from the passing aircraft while new ones are continuously generated from the various points of the leading and the trailing surfaces as the aircraft proceeds. The resulting complex of shock waves appears as a series of sheets having curved surfaces emanating from the points on the aircraft from which they are generated. At sufficiently large distances from the aircraft these shock surfaces tend to merge and appear conical. The surfaces of the cones are more or less oriented in the Mach direction of the local supersonic stream, that is, in the direction of a wave traveling at Mach one in the stream. For this reason, such cones are often referred to as Mach cones, although somewhat incorrectly since as previously noted, they propagate at a speed somewhat greater than the speed of sound. The portions of these Mach cones beneath the aircraft may eventually strike the ground, if not previously dissipated or merged in the atmosphere, producing a sonic boom. The sonic boom is therefore a composite of pressure waves caused by the various components of the aircraft which generate many elementary wave systems whose pressure profiles are in the form of N-waves, that is, the temporal or the spatial sequence of pressure variation approaches the shape of the letter "N." Each N-wave is composed of a forward region of overpressure, that is, above the ambient, due to the sudden pressure rise across a leading shock, followed by a gradual fall generally to below the ambient through a spread out expansion wave behind the shock, and often terminated by a sudden rise across a trailing shock. These elementary N-waves are of different strengths, scales and spacings superposed one on top of the other. Each elementary wave system decays in strength while propagating away from the aircraft by engulfing and energizing more and more air. The waves interact and merge. A notable nonlinear feature of the propagation of these wave systems is that various leading shocks, if not annihilated in the merging process, will eventually catch up with their preceding shocks and reinforce one another to form a single leading nose shock for the entire system in a homogeneous atmosphere. Thus, at a distance, say 500 aircraft lengths below the aircraft, a single N-wave emerges as an asymptotic wave form in the so-called "far field." Of course, at distances of one to two hundred aircraft lengths for example, some of the major shocks may not have coalesced so that in this region the pressure variation may still consist of several individual shocks. This is the "mid field" characteristic of the pressure variation. The complex shock pattern in the immediate vicinity of the aircraft is referred to as its "near field" characteristic.

A detailed description of the pressure variation, either spatially or temporally, is referred to as the "boom signature." The largest overpressure reached above the ambient is called the "peak overpressure" and the time required for the signature to reach the peak overpressure is called the "rise time." The integral of the force during the overpressure period is called the "positive impulse", corresponding to the positive area under the signature. These characteristics which make up the sonic boom from any aircraft, will clearly depend on the aircraft design configuration and the flow field around it, as well as the atmospheric conditions through which the wave system must pass before reaching an observer on the ground.

The intensity of sonic booms produced by some supersonic military aircraft flying at some 30,000 to 40,000 feet, have been found to be in the range of 2.0 psf (pounds per square foot) of overpressure. Overpressures of this magnitude and above, have generally been found in flight tests to be objectionable. To significantly reduce the overpressure, such supersonic military aircraft can fly at much greater altitudes. However, for much heavier supersonic transports which are already designed for cruising at high altitudes, in the range of from 60,000 to 70,000 feet, a problem arises.

For the commercial supersonic transports currently under development, the peak overpressure during cruise is expected to be generally less than 2 to 3 psf at ground level, well below values that might possibly cause physical damage to structures or even to sensitive organs of animals or people. Booms of the range, 2 to 3 psf, are basically an annoyance, particularly due to the element of surprise. The extent of annoyance varies with environments and subjective judgments, so that an annoyance index is exceedingly difficult to define. For example, the loudness of a sonic boom perceived by an observer apparently depends upon the initial rise time of the overpressure regions of its signature, since signatures with shorter rise times sound louder than those with the same peak overpressure and duration, but with longer rise times. This may be due to the fact that sonic booms with shorter rise times may have more energy in the frequency bands to which the human ear is most sensitive and therefore many people may regard such booms as highly annoying. On the other hand, the longer rise time signatures may be richer in frequencies at the lower end of the frequency spectrum, and beyond, and although hardly audible, their vibratory inputs may be as annoying or even more so to others. The difference in reactions will depend on the physical sensitivities of various observers. Their psychological dispositions at a given time, further complicate the matter. Whether some forewarning of the boom, which will put an observer under anticipation, is favorable or unfavorable is uncertain and dependent again on his subjective judgment. The environment will not only influence the psychological disposition of an observer, but also modify the nature of the boom signature. After traversing a structure such as a building, the relative constituency of various frequency components will be quite distorted and the dominant component inside the structure may be much different from that outside. Thus, subjects indoors and outdoors will have different responses to the same boom signature. Also, not to be overlooked is the fact based on laboratory tests, that repeated exposure to boom appears to increase the annoyance threshold and the tolerable levels of human subjects. The delineation of acceptable versus objectionable booms therefore, is so complex that after considerable detailed analysis, neither the scientific community nor the appropriate regulatory agencies can identify the most objectionable characteristics which should be reduced in preference to others.

Based on the latest published information, however, the following observations may serve somewhat as ground rules for interpreting the meaning of "reduction of sonic boom." It has been definitely determined that the acceptability of the boom is generally increased by: (1) reduction of peak overpressure (or underpressure if larger); and (2) reduction of positive impulse. Also, among boom signatures of similar peak pressure levels, detailed features such as the absence of spikes, the presence of finite rise time (10 millisec. or larger), more rounded and stretched out signatures or shockless signatures are often judged more acceptable. However, although some believe that shockwaves should be eliminated even at the expense of higher positive impulse, all of these detailed features of boom signatures do not seem nearly so important as the two major gross characteristics cited. Further, these detailed features will be seriously distorted, if not completely destroyed, upon traversing an intervening structure, and will not be of much significance in causing annoyance to subjects indoors. To subjects indoors, the positive impulse, being a temporarily integrated property of the boom signature, will be of concern and may indeed be more meaningful as an index of annoyance than peak overpressure, although the two are generally related at least for roughly similar signatures. A peak over pressure level of 1.5 to 1.7 psf has been correlated in laboratory tests and cited as equivalent to 110 PNDB (perceived noise in decibels) which is widely regarded as the maximum tolerable noise level. Thus, 1.5 psf has been suggested and quoted as the maximum tolerable boom overpressure level, but it will be seen that such an arbitrary gross characteristic is clearly not a satisfactory standard in view of the various factors previously discussed.

It is well established, however, that boom signatures with overpressure levels less than 1 psf are really not much of a nuisance especially for subjects indoors. Therefore, the reduction of boom overpressures for commercial supersonic transports to below 1.5 psf should be considered as the minimum objective and possibly to 1 psf as the ideal objective of any boom reduction devices if accomplished by the reduction of positive impulse to similar amounts.

In any event, it has been found that the aircraft design factors that particularly affect the intensity or severity of a sonic boom are the length and weight of the aircraft, as well as its speed and altitude. For the asymptotic N-wave form in the far field, that is, in the vicinity of the ground, theoretical and experimental studies have led to a reasonable estimate of the peak overpressure and of its qualitative dependence on various parameters. The peak overpressure may be roughly divided into two interrelated parts:

a. $\Delta p_V$, which is the component due to the airplane volume at zero lift; and b $\Delta p_L$, which is the component due to the angle of attack of the airplane in producing lift.

In a real atmosphere, estimates based on such theoretical studies show that while for an aircraft flying at low altitudes, $\Delta p_V$ dominates, at the high cruising altitudes of commercial supersonic transports (approximately 60,000 feet) and for such heavy aircraft, $\Delta p_L$ becomes the larger component. Thus, for the reduction of the boom from a cruising commercial supersonic transport, at ground level, the overpressure component due to the lift, that is, the "lift boom," $\Delta p_L$, is of particular concern. However, previous attempts at devising means for reducing the sonic boom have avoided operating on this component directly for fear of destroying the necessary lift on the aircraft.

Although most earlier proposals to reduce sonic booms have been based on theoretical estimates of the asymptotic overpressure, foremost among which are the concepts of early warning and of "phantom planes," they have been directed to displacing and/or weakening the leading nose shock and the tail or trailing shocks behind the aircraft while leaving the dominant wing shock unchanged. Various modes of implementing such concepts through conventional and exotic schemes have been proposed. However, none of these schemes have been favorably considered by the manufacturers, since none has met the two essential criteria of a practical solution, that is, that it be scientifically sound and be capable of feasible incorporation in a supersonic aircraft without upsetting the general performance requirements of the aircraft. The performance requirements of a successful commercial supersonic transport, for example, are highly restrictive so that the permissible variations in design parameters are quite marginal. Very little penalty in the form of weight or drag increase can be tolerated for boom reduction purposes. Hence, while another prior proposal, the multi-wing concept, is attractive and promises a meaningful reduction of the boom, it is not a practical solution because of the weight penalty of the complicated wing structure and/or the drag increase at off-design operation.

In view of the fact that the lift boom, $\Delta p_L$, is the dominant component of the boom from a cruising supersonic transport, then the present invention accordingly embodies a method for dealing with the lift boom to reduce the peak overpressure and the positive impulse, which method will be shown to be conceptually sound. In addition, a preferred means for accomplishing this method is presented which may be incorporated into the currently designed supersonic transports, or SSTs, without further upsetting their economic desirability. The approach taken is directed toward the weakening of the wing shock so as to decrease its propagation velocity while avoiding such interactions with the shock-waves as would cause a loss of the lift which must be derived from the wing to keep the aircraft in level flight. In fact, the present invention may provide increased lift, and improve the lift-to-drag ratio and the overall performance of the aircraft in the process to at least compensate for the unavoidable weight penalty caused by the incorporation of the boom reduction means on the aircraft.

SUMMARY OF THE INVENTION

The present invention involves the production of a jet stream of approximately equal pressure but higher Mach number than the ambient supersonic flow about the jet and the directing of this high speed jet stream toward the wing shock wave below the wing leading edge. The high speed jet stream, which will be called the anti-boom jet, intercepts the wing shock wave and produces an intense interaction. The interaction creates a pressure profile on the underside of the wing which maintains and, in fact, may, under proper conditions, improve the lift. The shock wave that emerges from the high speed jet stream is a refracted continuation of the leading wing shock, and is weaker than the wing shock without interaction, i. e., in the absence of the anti-boom jet. This weakened wing shock will propagate into the ambient atmosphere at a lesser velocity than the stronger wing shock, so that the boom signature at the ground level will be altered, since the wing shock wave, which normally reinforces the leading nose shock wave, will now be shifted aftward and separated from the leading nose shock. The slightly weakened and shifted wing shock will rise from a lower pressure level in the boom signature and reach a maximum overpressure at a level less than that resulting when the wing shock and nose shock are superposed. The maximum underpressure in the rear half of the boom signature can likewise be reduced and the boom signature will be stretched out downstream. With this method, the maximum overpressure caused by cruising commercial supersonic transports may be reduced appreciably below the 1.5 psf level and thus well into an humanly acceptable range.

The means for producing the high Mach number jet stream is located in whole or in part upstream of the wing shock wave and directs the anti-boom jet to interact with the shock wave emanating from the leading edge of the wing at appropriate distances therebelow. Various embodiments are possible and may comprise a single high pressure source in the fore section of the fuselage or may include in part some high pressure source carried elsewhere on board the aircraft. Since a major portion of the fluid flux in the anti-boom jet can be air economically captured from the ambient atmosphere, the main thrust-producing engines of the aircraft, with power capacity available may contain all the elements required to produce the jet and can be conveniently used for the purpose if properly located. If the excess power capacity is sufficient, no major hardware will be required which would result in a dead weight penalty. The energy may be derived from the same fuel as is required for the regular operation of the aircraft and the additional thrust derived from the anti-boom jet permits reduction of the thrust required to be derived from the regular operation of the jet engines. While, thermodynamically, the cruising thrust may be derived at a lower efficiency or a higher specific fuel consumption than the optimum choice of the aircraft designer without boom reduction consideration, the additional fuel expenditure in operating the anti-boom jet at the same total thrust level will be the expendable item in the price paid for boom reduction. Presently, the engines for the current commercial supersonic transports are all turbojets with afterburners which are adaptable to operation with the anti-boom jet means. However, if the anti-boom jet operation is to be incorporated into the main engines, other composite power plants, such as turbofan engines, may prove to be more advantageous overall, depending very much on the specific aircraft. Also, the engines' exhaust may be used with the anti-boom jet in weakening the wing shock wave.

In any event, a preferred embodiment is presented indicating the manner in which the new General Electric Company prototype GE4/J5P engine may be adapted to produce an anti-boom jet for satisfactory use on the prototype 2707-300 supersonic transport presently being manufactured by the Boeing Company.

BRIEF DESCRIPTION OF THE DRAWINGS

FIG. 7b is a plot illustrating the surface pressure over the upper and lower surfaces of the wing shown in FIG. 7a;

FIG. 9b is a p-δ shock polar for the interactions illustrated in FIG. 9a;

FIG. 10b is a p-δ shock polar for the interaction illustrated in FIG. 10a;

DETAILED DESCRIPTION OF THE PREFERRED EMBODIMENT

The present invention is concerned with complex and highly sophisticated concepts and devices in the field of aerodynamics and particularly in the field of supersonic flight. As competence in this art requires a considerable level of knowledge, it may therefore seem to one skilled in the art that the following description is perhaps, in some parts, somewhat superficial. However, it should be appreciated that a detailed description of all of the concepts, qualifications and calculations implicit in the description would require a burdensome amount of time and space while contributing little to an adequate understanding of the invention. Hence the description will cover the essential principles and phenomena necessary to an understanding of the claimed invention while avoiding those related theoretical and engineering aspects within the competence of those skilled in the art. The description will be presented in the following topical order:

| | |
|---|---|
| Brief Analysis of the Sonic Boom Signature | p. 15 |
| Effects of Altering the Boom Signature | p. 17 |
| Mechanics of Shock Wave Propagation in Altering the Boom Signature | p. 21 |
| Mechanics of Shock Wave Interaction in Weakening the Wing Shock | p. 28 |
| Mechanics of Shock Wave Interaction in Maintaining Lift | p. 33 |
| Achieving Improved Performance of Supersonic Aircraft | p. 38 |
| Means for Producing the Anti-boom Jet | p. 40 |
| Use of the General Electric Company's Prototype GE4/J5P Engine in Producing the Anti-Boom Jet | p. 48 |
| Arrangement of the Anti-Boom Jet Means on an SST | p. 55 |
| Arrangement of the Anti-Boom Jet on the Boeing Company Prototype 2707–300 | p. 58 |

BRIEF ANALYSIS OF THE SONIC BOOM SIGNATURE

Figures 1, 2:
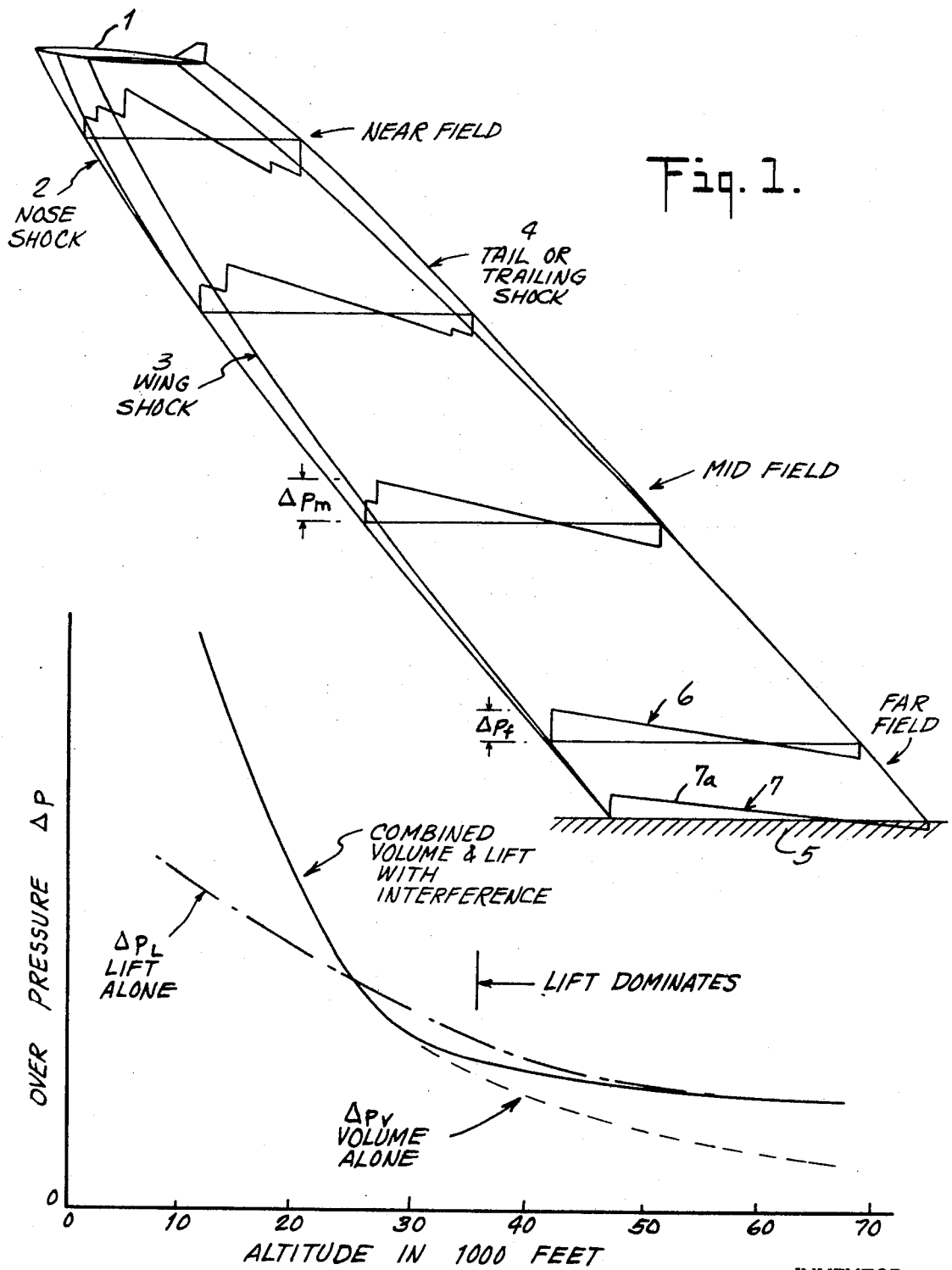
FIG. 1 illustrates an aircraft flying at supersonic speed and shows the propagation of the major shock waves to the ground level.
FIG. 2 is a plot of the contribution made to the over-pressure in a boom signature due to the volume of the aircraft and the lift thereon as a function of altitude.

FIG. 1 illustrates an aircraft 1 flying a supersonic speed and shows the propagation of the major shock waves, that is, the nose shock wave 2, the wing shock wave 3, and the tail, or trailing shock waves 4, to the ground level 5. It will be seen that in the near field, the shocks due to aircraft details are apparent, while in the mid-field region, only the major shocks survive, and in the far field, the signature is "frozen" in an asymptotic N-wave 6, which is independent of the aircraft details. The mid-field peak overpressure, $\Delta p_m$, will be larger than that at the far field, $\Delta p_f$, since the strength of the shock waves decays during propagation through the atmosphere. The signature measured on the ground will be in the form of a far-field, asymptotic N-wave 7, that is, an N-shaped pressure-vs-time or space profile. The forward portion 7a of the signature is characterized as a sudden rise in pressure $\Delta p_f$ above the ambient atmospheric pressure, followed by a gradual decay. This region of overpressure is composed of the leading nose shock wave 2 and the wing shock wave 3, since, during propagation, the wing shock wave travels faster in the heated wake of the nose shock wave and tends to catch up with it as seen in the figure. As previously stated, the peak overpressure is qualitatively dependent on various aircraft and atmospheric parameters but these may be roughly divided into two interrelated ground level boom components. These two components may be referred to as the volume boom $\Delta p_v$ and the lift boom $\Delta p_L$. The magnitude of the components may be expressed respectively as:

$$\Delta p_v = K_V(p_o p_g)^{1/2}(M^2-1)^{1/2}\frac{d}{l_v^{1/4}}\cdot\frac{1}{h^{3/4}} \quad (1a)$$

$$\Delta p_L = K_L p_g^{1/2}\frac{(2-1)^{3/8}}{M}\cdot\frac{W^{1/2}}{l_L^{1/4}}\cdot\frac{1}{h^{3/4}} \quad (1b)$$

where $k_V$ and $k_L$ are shape factors of the order of 0.5 to 1.0 and vary slowly with changes in aircraft shape; $p_o$ and $p_g$ are the atmospheric pressure at flight altitude $h$ and at ground level respectively; M is the cruising Mach number of the airplane at altitude $h$; $d$ and $W$ are the respective characteristic diameter of the airplane volume, and the airplane weight; $l_V$ is the overall length of the airplane, while $l_L$ is the characteristic length of the lifting surface.

It will be seen from equations (1a) and (1b) that $\Delta p_V$ decays as the one-half power of $p_o$ at flight altitude $h$, while $\Delta p_L$ is independent of $p_o$. Since the atmospheric pressure decays exponentially with increasing altitude, $\Delta p_V$ decays more rapidly than $\Delta p_L$ as $h$ increases, so that at low altitudes, $\Delta p_V$ dominates, while at the high cruising altitudes of the heavy commercial supersonic transports, $\Delta p_L$ becomes the larger component. These relationships are plotted approximately in FIG. 2 for a heavy aircraft and taking the interference between the two interrelated components into account. At SST cruising altitudes, therefore, the reduction of the lift boom $\Delta P_L$ is a major concern. It will also be seen that since increasing scale lengths $l_V$ and $l_L$ will reduce the boom according to the ¼ power law, many previously proposed solutions to the boom have gone in that direction and have suggested the creating of a "phantom airplane" of increased effective length over the actual physical length of the aircraft.

In contrast, the present invention proposes to weaken the lift boom by operating on the wing shock to weaken it and thus achieve a greater separation between it and the nose shock in the far field. Such an approach has generally been avoided in the past for fear of destroying the lift on the aircraft in the process. However, before presenting an explanation of how the wing shock may be weakened while the overall lift from the wing may be maintained, the benefit to be gained from separating the wing shock from the nose shock will be considered.

EFFECTS OF ALTERING THE BOOM SIGNATURE

Figure 5:
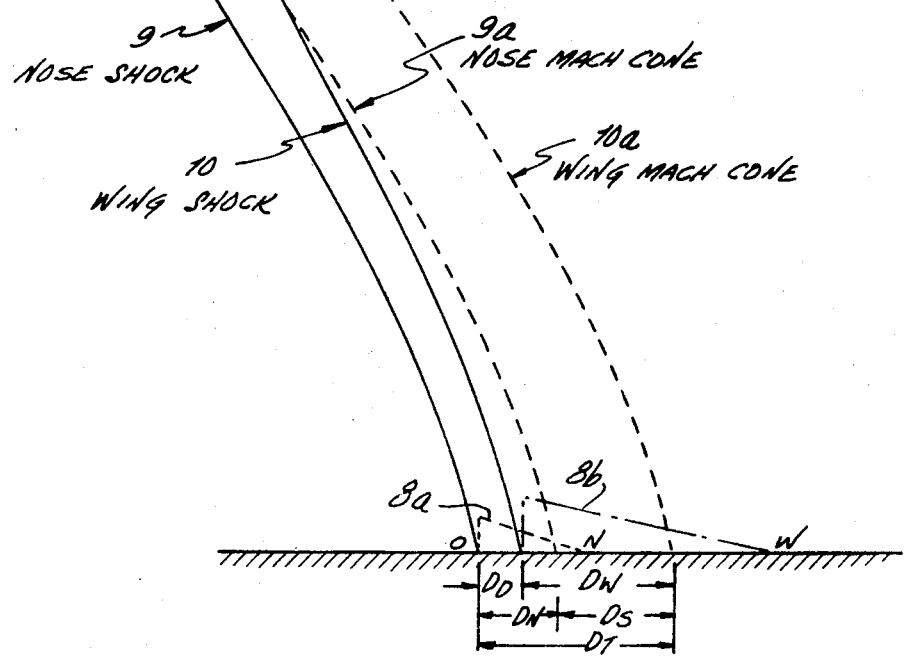
FIG. 5 is a diagram illustrating the propagation through the atmosphere of a nose shock front and a wing shock front from an aircraft with respect to each other and their associated Mach cones.

In the series of FIGS. 3 a–e and 4 a–e, two series of boom signatures are schematically shown. FIG. 3a represents a far field asymptotic N-wave 8 formed by a nose shock signature of unit strength, $\lambda_n=1.0$, reinforced by a wing shock signature of strength $\lambda_w=1.5$. The peak overpressure of the boom signature is 2.5 units. The dotted line indicates the forward portion of the elementary N-wave 8a associated with the leading nose shock. It is formed by the nearly conical shock resulting from the pointed nose of the supersonic aircraft from which it emanates, followed by expansion waves or fans which are generated by the gradual change of contour along the nose region and over the maximum section into the waist of the fuselage ahead of the wing root. The details of the lower magnitude aft portion of the wave 8a are omitted for clarity. The length O-N of the overpressure region of this nose shock signature consists largely of the forward displacement $D_n$ of the actual nose shock from the hypothetical Mach cone passing through the nose of the aircraft at the given instant (FIG. 5).

As previously indicated, an actual shock wave produced by a supersonic aircraft propagates at a speed somewhat greater than the speed of sound, that is, faster than a Mach wave originating from the same point, which propagates at the local speed of sound in the atmosphere. Thus, in propagating to the ground, an actual shock wave gains a distance D on an hypothetical Mach cone originating from the same point. As shown in FIG. 5, the actual nose shock front 9 preceeds the nose Mach cone 9a by a distance $D_n$ and the wing shock front 10 preceeds the wing Mach cone 10a by a distance $D_w$; the displacement between the nose shock and the wing shock fronts is $D_D$. The distance, $D_N$ for the nose shock, for example, as will be more fully explained below, may be of the order of 200 to 300 feet for an aircraft 300 feet in length, flying at 60,000 feet altitude. The zero over-pressure point N of this nose N-wave 8a will be only about 20 feet behind the Mach cone from the nose.

Figure 3A:
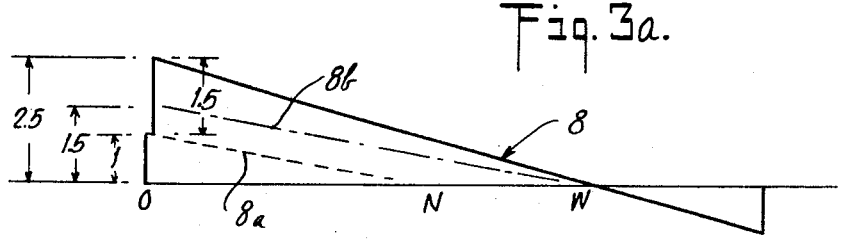
FIGS. 3 a–e and FIGS. 4 a-e are schematic diagrams of boom signatures illustrating the effect on the peak over-pressure and the positive impulse for various shifts of the wing boom with respect to the nose boom.

The dash-dot line in FIG. 3a indicates the wing shock-associated lift N-wave 8b in a position almost coinciding with the leading nose shock signature 8a. The zero over-pressure point W of the wing or lift N-wave 8b may be about 100 feet behind the nose Mach cone. Again, much of the length of the overpressure region of the lift N-wave 8b is due to the wing shock displacement $D_W$ ahead of the wing Mach cone which, as will be presently explained, may be of the order of 300–400 feet for the given example. The resultant boom signature 8 is roughly obtained by the superposition of the two elementary N-waves 8a and 8b, which gives a peak over-pressure of about 2.5 units.

Figure 3B:
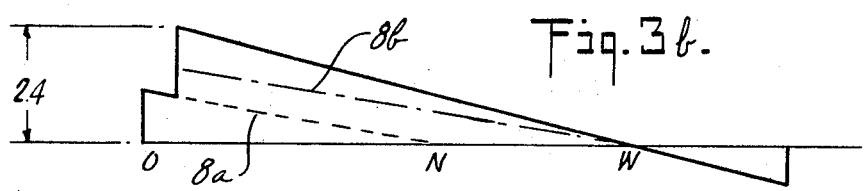
Figure 3C:
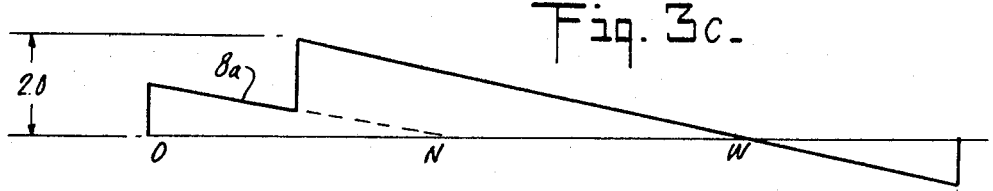
Figure 3D:

Now, suppose that the wing shock signature 8b is displaced toward the rear by 1/10 of the over-pressure length O–N of the nose signature 8a. The superposition of the wing shock overpressure onto the lower nose shock overpressure will lead to a peak overpressure of 2.4 units as illustrated in FIG. 3b. If the wing shock signature 8b should be displaced rearward by ½ or even 1 overpressure length O–N as shown in FIGS. 3c and 3d, respectively, the peak overpressure level would be reduced to 2 and 1.5 units, respectively, corresponding to 20 and 40 percent reductions of the boom signature overpressure.

The diagrams in FIGS. 3a–d depict situations wherein the entire wing signature over O–W is rearwardly displaced, while nose shock O–N remains unchanged. This type of signature movement may be accomplished by shifting the entire wing structure with respect to the nose of the aircraft. However, it should be noted, in these cases, the total positive impulse is not substantially changed, although the peak overpressure is significantly reduced.

Suppose now, the wing signature 8b is displaced rearwardly by weakening and slowing down the wing shock without affecting the zero point of the wing wave system. This is the situation illustrated in the diagrams shown in FIGS. 4a–d. It will be seen that not only will the peak overpressure be reduced to the level achieved by the previously mentioned wing structure shift, but also that the positive impulse will be reduced as much as the peak overpressure. This can be accomplished if the shock from the leading edge of the wing is reduced in strength while maintaining the lift fairly constant and without changing the position of the wing trailing edge, so as to maintain the overpressure zero point substantially at W. In actuality, under the constraint of a constant lift from the wing surface, the weakening of the shock from the leading edge of the wing will likely be accompanied by some slight rearward shift of the zero point W of the signature 8b. The effects on the reduction of the peak overpressure and the positive impulse in an actual situation will thus be modified slightly from the extreme situation described in the series of FIGS. 4a–d, toward the other extreme situation described in the series of FIGS. 3a–d.

In any event, the diagrams in FIGS. 3a–d and 4a–d show that the peak overpressure of the boom may be reduced from 2.5 units to 1.5 units when the signature of the wing shock is shifted back to the zero overpressure point N. However, if we ignore the complicated effects on the rear half of the boom signature, the peak overpressure can be lowered even further to the level of the leading nose shock by shifting the wing shock signature further back into the valley behind N. It will be seen that this is possible in view of the fact that the wing shock strength $\lambda_w = 1.5$ is larger than the nose shock strength $\lambda_n = 1.0$. But, if, conversely, the aircraft structure were modified to have a "fat nose" so that $\lambda_n = 1.5$, while $\lambda_w = 1.0$, there would be little advantage in shifting the weaker wing shock signature as far back as point N, since the peak overpressure would remain at the 1.5 units level of the nose shock for any position of the wing shock within the last ⅓ of the nose signature O–N, and behind. This observation is of importance in the event that an extensive redesign or a new design of supersonic aircraft is considered from the particular point of view of reducing the sonic boom.

Figure 3E:
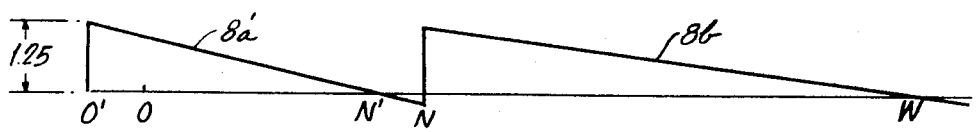
Figure 4A:
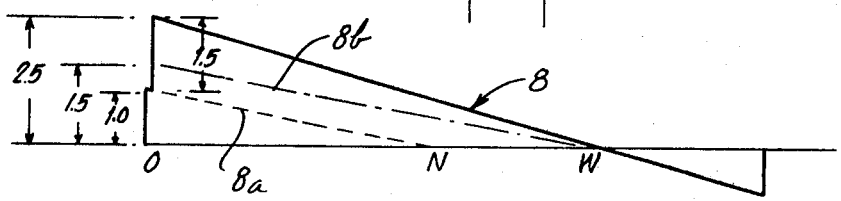
Figure 4B:
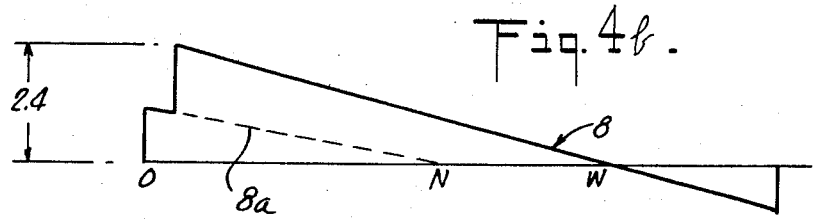
Figure 4C:
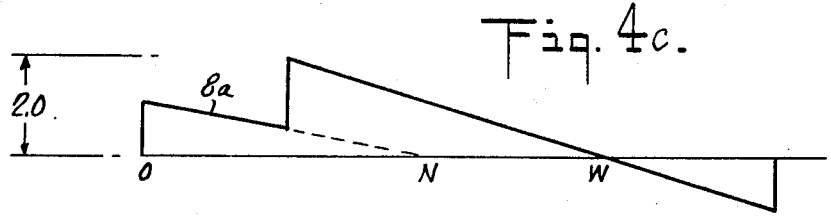
Figure 4D:
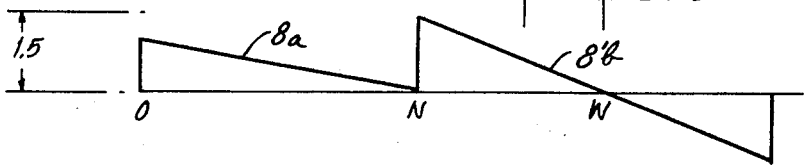
Figure 4E:
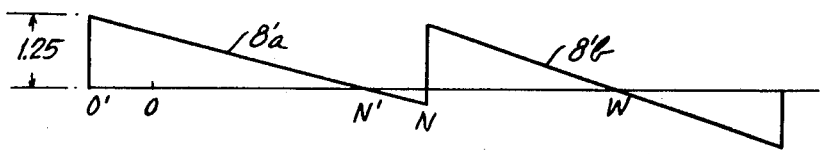

Another operation in the boom signature will permit the peak overpressure level illustrated in FIGS. 3d and 4d to be reduced below 1.5, even though the wing shock signature is shifted only to the zero overpressure point N of the nose shock. This may be accomplished by slightly strengthening the nose shock from $\lambda_n = 1.0$ to about 1.25 units as shown in FIGS. 3e and 4e and correspondingly shifting the zero overpressure point N upstream to N'. This strengthened nose shock signature 8'a will then lead the wing shock even further so that the wing shock signature 8'b although still of strength $\lambda_w = 1.5$, will now fall slightly in the valley behind N' and rise to a peak overpressure of 1.25 also. Thus, the strengthening and the upstream shift of the nose shock will lead to a reduction of the peak overpressure. This can be achieved, for example, by increasing the nose angle of the aircraft and shifting the maximum sectional area of the nose forward, or as will be explained later, by proper orientation and other adjustments of the anti-boom jet stream.

In order to further explain the intricacies of the principle and method of operation of the present invention, the mechanics of shock wave propagation particularly in connection with altering the boom signature will now be considered in some detail.

MECHANICS OF SHOCK WAVE PROPAGATION IN ALTERING BOOM SIGNATURE

Figure 6:
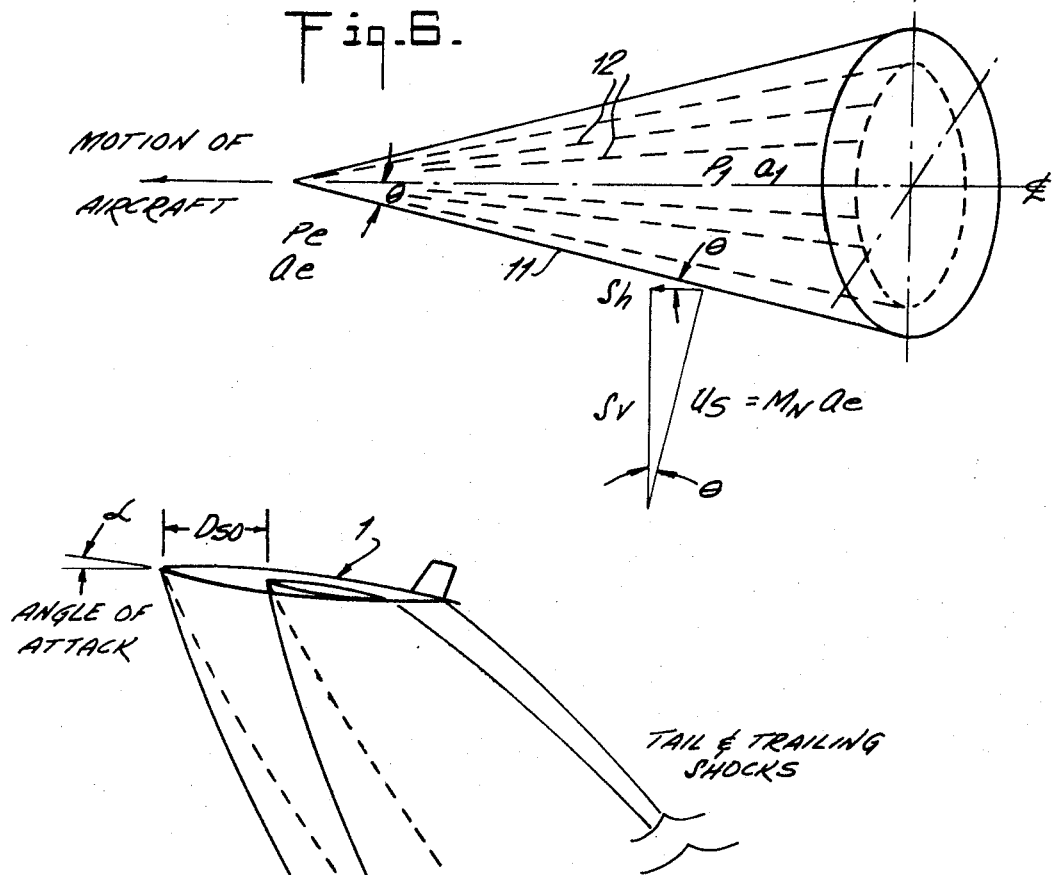
FIG. 6 is a diagram illustrating the components of propagation of a Mach cone and a shock wave in the atmosphere.

The strength of a shock wave has been characterized by $\lambda$ which is a ratio defined as the pressure rise across the wave ($p - p_e$) divided by the air pressure $p_e$ ahead of the wave, i.e., $$\lambda = (p - p_e)/p_e \quad (1)$$

where $p$ is, of course, the pressure in the region behind the wave. The dynamic laws governing the propagation of a shock wave in a flow field are the conservation laws of mass, momentum and energy. For propagation in the atmosphere, air may be considered as an ideal gas with constant specific heat ratio $\gamma = 1.40$. So, if $\theta$ is the angle of inclination of the air flow relative to the local shock front 11, as shown in FIG. 6, and $M_e$ is the local flow Mach number, then $M_n = M_e \sin\theta$ will be the Mach number of the speed of propagation of the shock front 11 in the direction normal to the front, and the propagation velocity of the shock front 11 may be expressed in terms of the local speed of sound $a_e$ as $u_s = M_n a_e$ where:

$$M_n = M_e \sin\theta = (1 + (\gamma+1/2\gamma)\lambda\ )^{1/2} \quad (2)$$

It will be seen that for a very weak shock, where $\lambda$ is very small, the wave propagates at the speed of sound ($M_n = 1$), and is thus called a Mach wave. In three-dimensional space, such a weak wave front generated by a point source in supersonic motion is in the form of a cone called a Mach cone 12, also shown in FIG. 6. For a wave generated by an aircraft, the velocity of propagation of the shock front 11 can be resolved into a component $S_v$ perpendicular to the ground and a horizontal component $S_h$ parallel to the ground in the direction of cruising flight. For the leading nose shock propagating into an undisturbed quiescent atmosphere with local speed of sound and an aircraft cruising speed $u_e = M_e a_e$, we have:

$$S_v = u_e \sin\theta \cos\theta$$
$$= a_e\left[1 + \left(\frac{\gamma+1}{2\gamma}\right)\lambda\right]^{1/2}\left[1 - \frac{1}{M_e^2}\left(1 + \frac{\gamma+1}{2\gamma}\lambda\right)\right]^{1/2} \quad (3a)$$

$$S_h = u_e \sin^2\theta = \frac{a_e^2}{u_e}\left[1 + \left(\frac{\gamma+1}{2\gamma}\right)\lambda\right] \quad (3b)$$

For shock waves propagating into disturbed atmosphere, all the kinematic quantities in these equations, that is, $u_e$, $\theta$, $a_e$ and $M_e$ should be referred to the local relative air velocity which is not necessarily parallel to the ground. In such event, equations (3a) and (3b) still apply, but the subscripts $v$ and $h$ designate the velocity components perpendicular and parallel to the local flow direction rather than to the ground.

During propagation, a shock wave decays in strength unless suddenly reinforced by another shock wave catching up from behind and while the speed of sound increases in the atmosphere toward the ground level, so does the speed of propagation of a shock wave. Also, since the pressure always increases across a shock wave, $\lambda$ is always positive no matter how small, so that, as will be seen from equation (2), a shock wave will always lead a local Mach wave whose $\lambda = 0$ in its propagation. As a result, a horizontal separation D between the shock front 11 and the associated hypothetical Mach cone 12 occurs, which increases with the distance of propagation. At a height h below the cruising altitude of an aircraft and immediately underneath the flight path this separation distance D is given by the integral:

$$D = \int_1^{h/y_0} dy \, \frac{a_o^2}{u_o^2}\left(\frac{\gamma+1}{2\gamma}\right)\lambda \Big/$$

$$\left[\left(1+\frac{\gamma+1}{2\gamma}\lambda\right)\left\{1-\frac{1}{M_e^2}\left(1+\frac{\gamma+1}{2\gamma}\lambda\right)\right\}\right]^{1/2} \quad (4)$$

where $y_o$ is the length of the aircraft, and $y$ represents the vertical distance expressed in terms of $y_o$. The lower limit of integration $y = 1$ represents the reference altitude one aircraft length below the cruising altitude. The quantities $\lambda$, $u_e$, $a_e$ and $M_e$ inside the integral are all functions of $y$.

When the rate of decay of the shock strength $\lambda$ is estimated by ray acoustics in real atmosphere, a fairly narrow upper and lower bound of the separation distance D in the field far from the aircraft can be obtained to replace the integral in equation (4), thus $$\left(\frac{\gamma+1}{2\gamma}\right)\frac{\pi}{(M^2-1)^{1/2}} \cdot \frac{\lambda_0(y_0 H)^{1/2}}{\left(1+\frac{H}{hg}\right)^{1/2}}$$

$$< D_s < \left(\frac{\gamma+1}{2\gamma}\right)\frac{\pi}{(M^2-1)^{1/2}} \cdot \lambda_0(y_0 H)^{1/2} \quad (5)$$

where the subscript $g$ refers to ground level and subscript $o$ refers to the reference altitude. $H$ is the density scale height of the exponential atmosphere, generally taken as about 30,000 feet.

In concrete terms using, for example, values based on those for the previously mentioned Boeing Company SST prototype 2707-300, with $y_o=300$ ft. and $h_g = 60,000$ ft., a conical nose shock of strength $\lambda_o = 0.1$ will have a separation distance $D_N$ on the ground lying between 260 and 320 feet as computed from equation (5). Note that the upper bound of 320 feet cannot be exceeded even if $h_g$ is much greater than H. With $h_g$ approximately equal to 2H, both the upper and the lower bound will be about 80 percent of these values, that is, about 200 to 260 feet, which may actually be a more accurate estimate. For a rear or tail shock of similar strength, the signature would lag a similar amount. Thus, the overall length of the boom signature may be 700 to 900 feet or about 2 to 3 lengths of the aircraft.

The wing shock will be stronger than the nose shock and is essentially planar near the wing. It propagates into an atmosphere which has been set in motion with a velocity $u_e \sin\theta/[1 + (\gamma+1/2\gamma)\lambda]$, by the leading nose shock in a direction normal to the shock front. This disturbed air is at a slightly higher pressure and temperature than the ambient air into which the nose shock is propagating. From FIG. 5, it can be seen that the motion of the wing shock wave 10 relative to the moving nose shock wave 9 will hence consist of two displacements:

i. The displacement $D_w$ of the wing shock front 10 from the wing Mach cone 10a, which displacement may be evaluated from equation (4) or (5) and (ii) the displacement $D_T$ of the nose shock wave 9 from the wing Mach cone 10a. Then, $D_T = D_s + D_N + D_D + D_w$ or $D_D = D_s - (D_w - D_N)$ where $D_s$ is the distance between the Mach cones from the aircraft nose and the wing. Thus, the displacement $D_D$ between the nose shock 9 and the wing shock 10 is a function of the difference between $D_W$ and $D_N$.

Figure 7A:
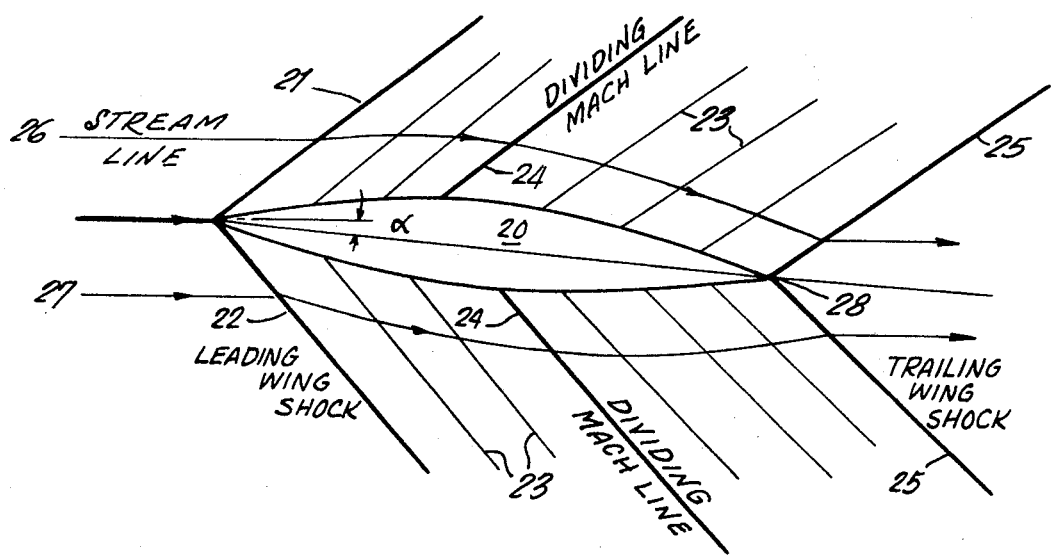
FIG. 7a is a representative two-dimensional section across a bi-convex wing of an aircraft in supersonic cruise at an angle of attack $\alpha$ illustrating the resulting shock waves and expansion waves forward and aft of the dividing Mach line of the wing.

The wing is generally located in the waist of the fuselage in accordance with the well-known aerodynamic "Area Rule" behind the "dividing Mach line" of the fuselage, which will be explained more fully in connection with FIG. 7a. The Mach cones from this region are retarded by the overexpanded flow behind the nose Mach cone and will lag behind the undisturbed Mach cone from the nose with increasing horizontal separation between them, so that $D_s$ will be somewhat larger than the distance $D_{so}$ between the aircraft nose and wing. Accordingly, the difference between the values of $D_w$ of the wing shock and of $D_N$ of the nose shock evaluated from equations (4) or (5), i.e., $D_W-WN$ will slightly overestimate the decrease of the horizontal separation distance between the two shocks from the initial separation.

The strength of the wing shock varies along the wing span and approaches zero at the wing tip. Thus, although the wing tip is initially nearest to the nose conical shock, the wing shock from the tip will not catch up to the nose shock. The wing shock strength increases inboard toward the fuselage and despite the larger initial separation, the wing shock inboard, if sufficiently strong, will catch up and reinforce the nose shock. For example, the major lifting shock from the wing in the prototype 2707-300 will be initially 100 to 150 feet behind the nose. If the reference strength $\lambda_o$ of the wing shock is, say, about 0.05 larger than that of the nose shock, the signature of the wing shock will reinforce that of the nose shock and the asymptotic N-wave boom signature will result. If it is appreciably lower, however, the wing shock will not have caught up by the time the shock system reaches the ground. The boom signature at the ground level will then contain multishocks as in the mid-field profile rather than the asymptotic far field form.

It will be appreciated by those skilled in the art that the foregoing presentation introduces the shock expansion type argument into the quasi-linear theory of G. B. Whitham, which is particularly set forth in the articles "The Flow Pattern of a Supersonic Projectile," Communication in Pure and Applied Mathematics, Vol. 5, 1952, pp. 301-348, and "On the Propagation of Weak Shock Waves," Jour. of Fluid Mechanics, Vol. 1, 1955, pp. 290-318. The foregoing modification is in recognition of the fact that shock waves do originate directly from certain surfaces of the aircraft rather than emerge slowly from the congruence of isentropic compression waves from which the Whitham F-function is computed. The slow development of the asymptotic N-wave form is due to the slow merging of the various major shocks emanating from the aircraft surface. While Whitham's asymptotic results, in estimating the peak overpressure, cannot be successfully applied to a boom signature not yet fully developed into the asymptotic state, the same asymptotic results can be employed to estimate the strengths of individual shocks prior to their annihilation or merging with other shocks. In this sense, ray acoustics can be used in estimating the decay of individual weak shock waves with some modification. The presence of an absolute upper bound of D for infinite distance of propagation and the possibility of two shocks remaining separated in real atmosphere if the upper bound of $D_W-D_N$ is less than their initial separation are in agreement with W. D. Hayes' predictions of the aging of signature shape, as explained in the article "Self-similar Strong Shock in an Exponential Medium," Jour. of Fluid Mechanics, Vol. 32, 1968, pp. 305-316.

The results of optimization studies based on Whitham's theory by presuming the far field, asymptotic N-wave signature, are very much different from the results obtained when mid-field characteristics of the signature are taken into consideration. Based on the far field results, none of the many boom reduction schemes that have been proposed are practical and optimization studies for redistributing the lift suggest the desirability of heavier loading near the wing leading edge to reduce the boom. However, the development in the foregoing presentation suggests, on the contrary, that the weakening of the loading of the wing leading edge in order to maintain the mid-field boom characteristics is more desirable. Lighter wing loading near the leading edge weakens the leading wing shock which, as explained previously, will lag further into the pressure valley of the leading nose shock. It then follows that the loading of the rear and inboard portions of the wing surface should be increased to maintain the overall lift.

The extension of the wing structure or the rearward shift of the whole wing would serve to appropriately vary the wing shock signature. However, although desirable, such a modification could presently only be considered in the design of a new aircraft as the existing SST prototypes would not be readily adaptable. Such a modification would also be likely to involve an extensive fixed structural weight penalty on the aircraft during flight periods when boom reduction is not needed. Accordingly, a preferred adaptation of existing SST aircraft will be described for achieving the weakening of the wing shock which does not involve extensive modification of the wing structure.

MECHANICS OF SHOCK WAVE INTERACTION IN WEAKENING THE WING SHOCK

We shall now turn to the explanation of how the wing shock is weakened. For illustrative purposes, as shown in FIG. 7a, a bi-convex airfoil section 20 at an angle of attach $\alpha$ less than the nose angle, is taken as a representative two-dimensional section across the wing of an aircraft in supersonic cruise. A pair of shock waves 21 and 22 are created at the leading edge of the airfoil 20, one on the upper and one on the lower surface. The wave 22 on the underside of the wing edge will be stronger and propagates toward the ground. The bi-convex contour of either the upper or the lower wing surface generates a family of expansion waves 23 distributed over the entire section 20, with the pressure over the rear portion being considerably below that over the upstream portion of the wing section. This family of expansion waves on either side can be divided into two groups separated by a dividing Mach line 24. The waves 23 in front of the dividing Mach line 24 on the lower side will eventually catch up to the lower leading edge shock 22 to account for part of the decay of the shock wave during its propagation to the ground. The expansion waves 23 behind the dividing Mach line 24 overexpand the air and will not catch up to the shock wave 22 from the leading edge but will eventually be merged into the shock wave 25 from the trailing edge. The trailing shocks 25 are formed when the two air streams 26 and 27, moving at different velocities along the upper and the lower wing surfaces, respectively, meet at the trailing edge 28. The trailing shocks 25 act to turn the two streams 26 and 27 to again flow in the same direction and at the same pressure aft of the wing.

Figure 7B:
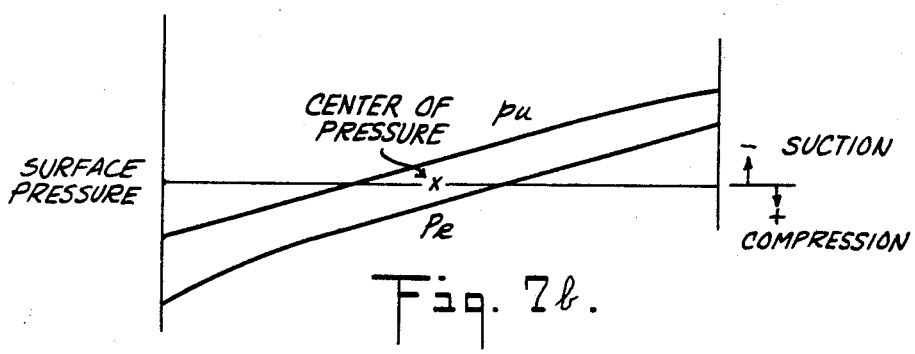

A diagram of the static pressure on the upper and the lower wing surfaces is given in FIG. 7b. The lift on the wing is the difference between the component of force acting on the upper surface $P_u$ and that acting on the lower surface $P_l$ of the wing in the direction of the lift. It will be seen in FIG. 7c that the lift is distributed fairly uniformly over the wing chord and is due to the excess overpressure on the forward half of the lower (or pressure) surface and to the excess underpressure on the aftward half of the upper (or suction) surface. The center of pressure is nearly the midchord. Such pressure variation over a wing surface in a supersonic flow stream is produced by the shock and expansion waves so that certain basic properties associated with a shock wave should be kept in mind, particularly preparatory to the subsequent discussion. Firstly, pressure, density and temperature increase across a shock wave while the velocity of flow decreases. The direction of flow is deflected toward the shock wave and the deflection is a function of the pressure change across the wave and the Mach number of the flow. The deflection decreases with increasing Mach number and the pressure ratio across a shock wave increases with increasing Mach number. Weaker shock waves propagate more slowly than stronger waves and the converse rarefaction or expansion waves will produce results directly opposite to that of shock waves.

Figure 8A:
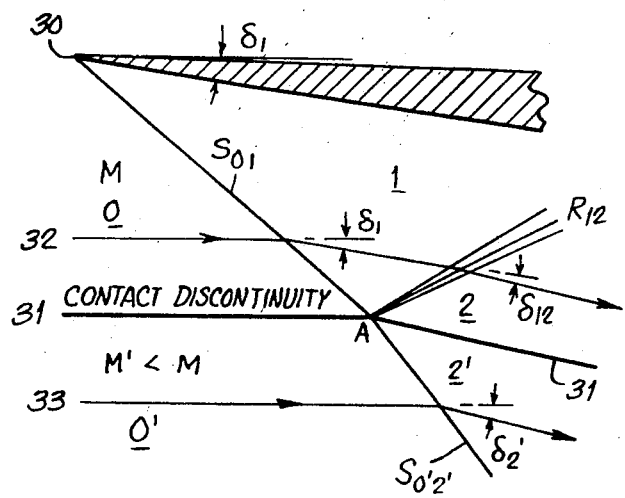
FIG. 8a is an illustration of the interaction between a wing shock wave and a contact discontinuity produced by a stream having a lower Mach number than that of its ambient flow past a wing of an aircraft in supersonic cruise.

Now, as shown in FIG. 8a, a shock wave $S_{01}$ from a wing leading edge 30 deflects the ambient air flow through an angle $\delta_1$. This is the angle through which the air flow next to the aircraft surface must turn to accommodate the configuration of the aircraft wing. It is this deflection angle $\delta$ which determines the strength of the shock waves originating from the various surfaces of the aircraft. It is given by the relation:

$$\tan^2\delta = \left(\frac{\lambda}{\gamma M^2 - \lambda}\right)^2 \frac{2\gamma M^2 - 2\gamma - (\gamma+1)\lambda}{2\gamma + (\gamma+1)\lambda} \quad (6)$$

Figure 8B:
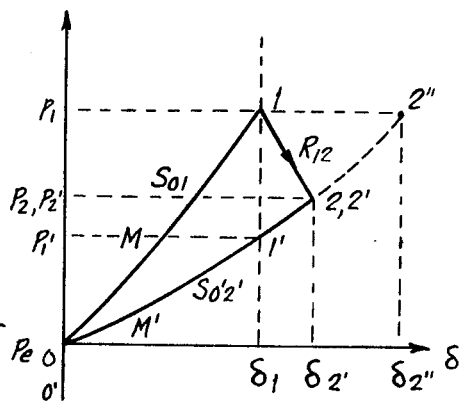
FIG. 8b is a plot known as a p-δ shock polar illustrating the pressure ratio across the shock wave shown in FIG. 8a as a function of the angle of deflection of the flow for different Mach numbers.

This relation when plotted with $p=p_e(1+\lambda)$ versus the deflection angle $\delta$ for a given value of flow Mach number M as in FIG. 8b, is known as the p-$\delta$ shock polar. As shown in FIG. 8b, the origin, or zero point of the plot designates the zero deflection angle, i.e., $\delta=0$, and the air pressure $p_e$ in front of a shock wave. Each curve through the point O is a shock polar for flow of a given Mach number, M. Each point on the curve 0-1 for example, represents the pressure $p$ behind a shock wave after it has deflected the air stream through an angle $\delta$.

Consider now that there is present in the atmosphere a contact discontinuity, that is, a surface separation two parallel air streams which have the same pressure but which are moving with different Mach numbers. (They may also differ in many other ways). As shown in FIG. 8a, when a shock wave $S_{01}$ is incident on a contact discontinuity 31, it is partially transmitted and refracted, and partially reflected. This interaction is conveniently analyzed with the p-$\delta$ shock polar in FIG. 8b, taken together with FIG. 8a. The curve $S_{01}$ represents the shock in upper stream 32 of Mach number M, in FIG. 8a, which raises the stream pressure from $p_e$ in region O to $p_1$ in region 1 and deflects the stream 32 through angle $\delta_1$. The shock $S_{01}$ is incident on the contact discontinuity 31 at point A. Now, if the shock $S_{01}$ were transmitted unchanged in strength into lower stream 33, whose Mach number is $M^1$, which is less than M, it would cause the shock transition in the lower stream 33 to go from the pressure at point O on the plot to that at point 2″ and deflect the stream 33 through an angle $\delta_{2''}$ larger than $\delta_1$. The two neighboring streams 32 and 33 would then diverge. On the other hand, if the shock $S_{01}$ were transmitted so as to deflect the lower stream 33 through the same angle $\delta_1$, the pressure in the stream 33 would be raised only to the point $1^1$, on the shock polar, lower than that of point 1. Therefore, the condition of equal pressure between the two neighboring parallel streams 32 and 33 can only be achieved by the creation of an expansion of rarefaction wave $R_{12}$, reflected from the point A. The isentropic expansion from the Mach number at point 1 follows the line of isentrope 1–2 in the p-$\delta$ polar diagram. The intersection of this isentrope with the shock polar 0–1′–2″ at point 2 or 2′ determines the state of the region 2 behind the expansion fan $R_{12}$ in the upper stream 32 and the state of region=2′ behind the transmitted shock $S_{0'2'}$ in the lower stream 33. 2 and 2′ are the same point in the p-$\delta$ polar diagram since the two states are at the same pressure and deflection angle although they differ in Mach numbers and many other quantities. We see then that the transmitted shock $S_{0'\ 2'}$ into stream 33 of lower Mach number is weaker than the incident shock $S_{01}$ in stream 32 with a higher Mach number.

Figure 8C:
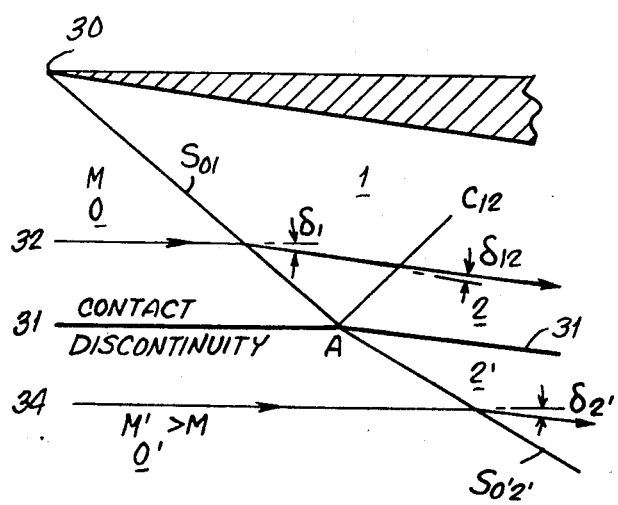
FIG. 8c is an illustration as in FIG. 8a, wherein the contact discontinuity is produced by a stream of higher Mach number than that of the ambient flow past the wing of the aircraft.
Figure 8D:
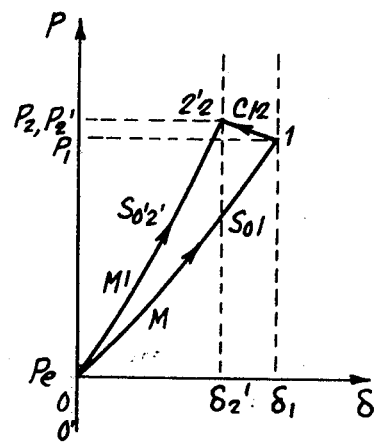
FIG. 8d is a p-δ shock polar for the interaction illustrated in FIG. 8c.

FIGS. 8c and 8d demonstrate the situation for a stream 34 whose Mach number, M′, is greater than M. A shock wave $C_{12}$ will be reflected from point A and the transmitted shock into a stream 34 of higher Mach number is stronger than the incident shock $S_{01}$. When the difference between the two Mach numbers M′ and M is small, the reflected shock wave $C_{12}$ is weak and may be treated as an isentropic compression wave. The isentrope 1–2 is defined by the Prandtl-Meyer relation:

$$d\lambda = \pm \frac{\gamma M^2}{\sqrt{M^2-1}} d\delta \qquad (7)$$

By eliminating $\delta$ and M at the state 1 between equation (7) and the differential relation of equation (6), a complicated nonlinear differential equation results. This relation gives the variation of the transmitted shock strength crossing a contact discontinuity of small Mach number difference. The nonlinearity of this relation is very important as will be appreciated by those skilled in the art.

Figure 9A:
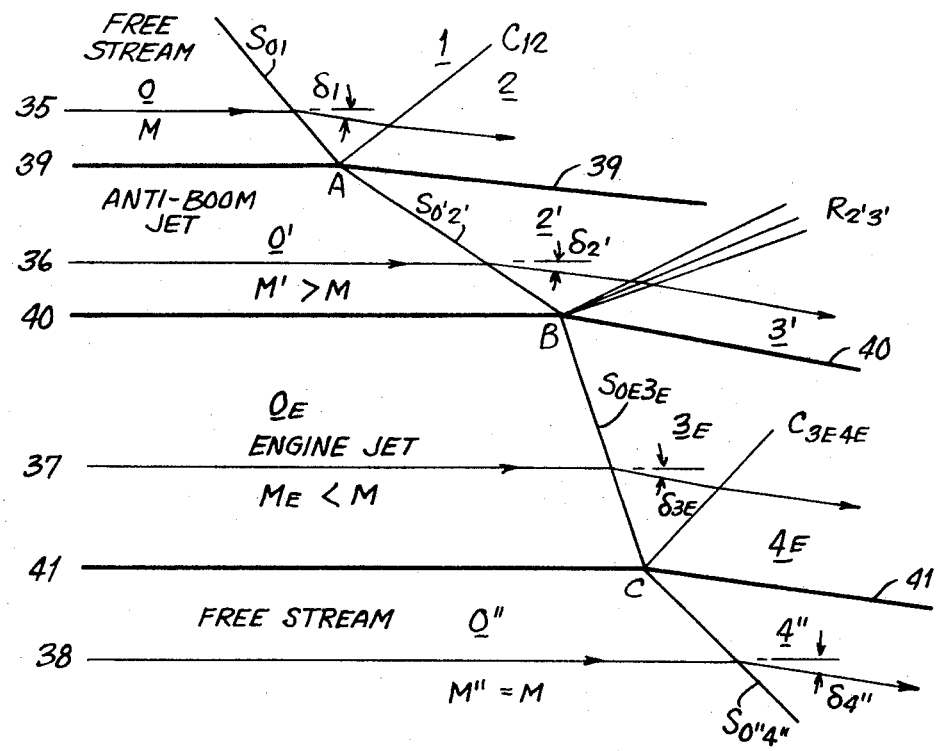
FIG. 9a is an illustration of the interaction of a shock wave in a supersonic stream passing through a series of contact discontinuities produced by successive streams having a higher Mach number and a lower Mach number respectively than that of the supersonic stream.
Figure 9B:
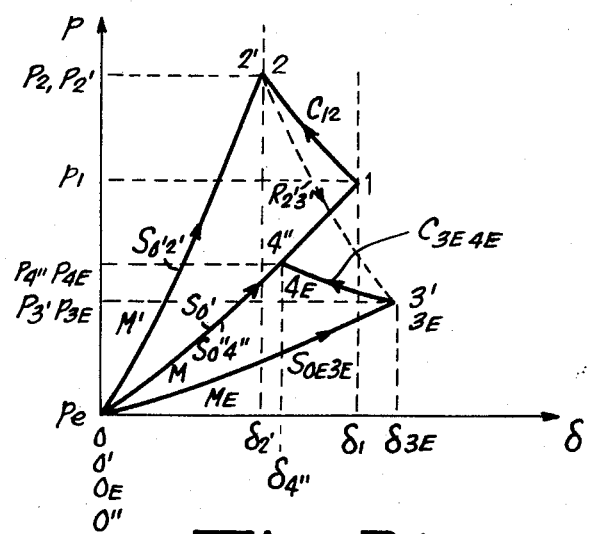

Turning next to FIG. 9a, consider the crossing of a shock wave $S_{01}$ through three parallel streams. Stream 36 is of higher Mach number, stream 37 is of lower Mach number, and stream 38 is of equal Mach number with the upper stream 35. Curve 0-1 in the P-$\delta$ polar of FIG. 9b represents the shock transition of the upper stream 35 with Mach number M from state 0 to state 1. A shock $C_{12}$ is reflected from point A on the contact discontinuity 39. The reflected shock $C_{12}$ brings the stream 35 to state 2 in balance with state 2′ in the stream 36 of higher Mach number M′, which results from the crossing of the transmitted shock $S_{0'\ 2'}$. This transmitted shock $S_{0'\ 2'}$ is incident on the lower contact discontinuity 40 at point B and is refracted into the next stream 37 of Mach number $M_E$ which is lower than the Mach number M. An expansion wave $R_{2'\ 3'}$ will be reflected from B bringing the stream 36 to the state 3′ in balance with the state 3E brought about by the transmitted shock $S_{OE3E}$ in the lower Mach number stream 37. The shock $S_{OE3E}$ is then incident on the lowest contact discontinuity 41 at C and emerges into the stream 38 whose Mach number M″ is equal to M. A shock $C_{3E4E}$ is reflected from point C to bring the state 4E in balance with the state 4″ in the stream 38 brought about by the emerged shock $D_{0''\ 44''}$. Since the Mach number of the flow at 2′ is higher than the Mach number at 2 and the Mach number of the flow at 3′ is even higher than that at state 3E, the p-$\delta$ polar diagram in FIG. 9b can be used to determine the relative positions of these reflected shock curves and the various states. It will be seen that the pressure rise across the emerged shock $S_{0''\ 4''}$ (point 4″) is considerably less than the pressure rise across the original shock $S_{01}$ (point 1). Therefore, the emerged shock strength is considerably weakened by the two intervening streams.

It should be understood that the situations described in FIGS. 8a-d and 9a-b are idealized in that each stream is of uniform Mach number and the contact discontinuities remain sharp. In actuality, the sharp discontinuities will be diffused by molecular and turbulent fluctuations and will be replaced by mixing zones of gradual change of various quantities from one stream to another. Isentropic compression waves will replace the reflected shock waves $C_{12}$ and $C_{3E4E}$ from A and C. Each set of compression waves will converge to form a single shock eventually if not intercepted. The illustrations in FIGS. 8a-d and 9a-b, also describe the situation when the thickness of the mixing zone is considerably less than the width of each stream. However, the p-$\delta$ polar diagrams show that such modification is not of fundamental importance.

Now, if the shock $S_{01}$ represents a shock emanating from w wing leading edge with the lower wing surface serving as the solid boundary, it will be seen that an interaction will jet streams of different Mach numbers weakens the emerged shock $S_{0''\ 5''}$. This weaker shock upon propagating to the ground will produce a smaller pressure rise and will lag behind the signature of the original wind shock $S_{01}$, that is, the shock not intercepted by the jet streams.

MECHANICS OF SHOCK WAVE INTERACTION IN MAINTAINING LIFT

Figure 10A:
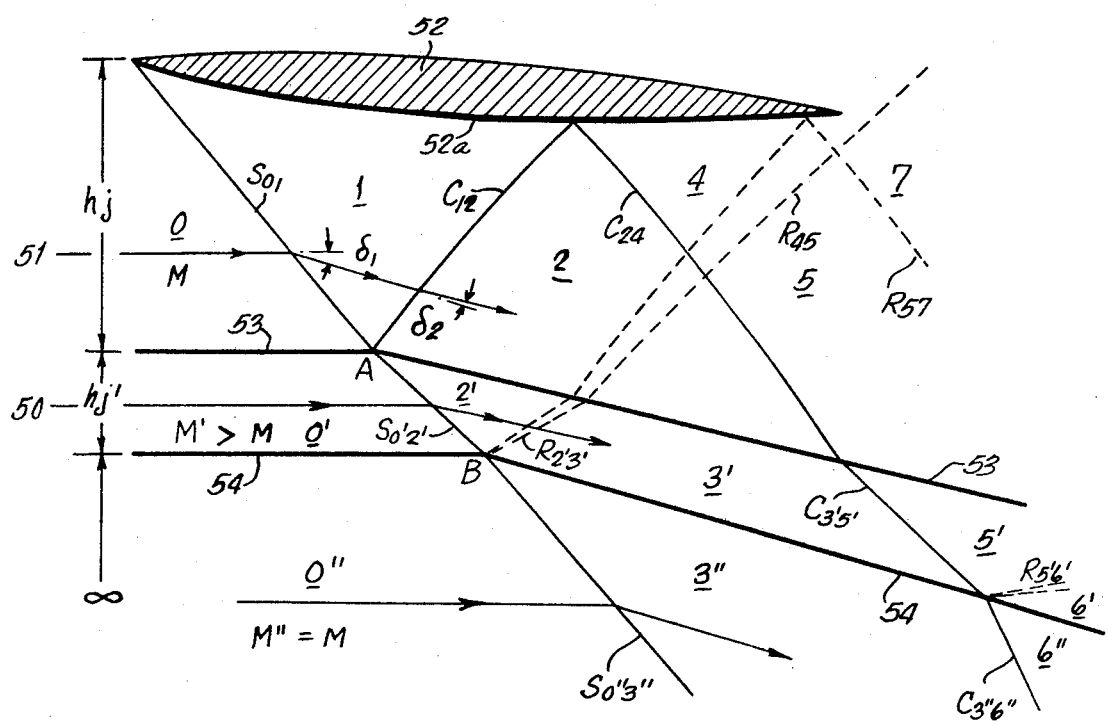
FIG. 10a is a more detailed illustration of the interaction of a shock wave from a bi-convex airfoil with a contact discontinuity produced by a stream of higher Mach number than that of the flow stream passing by the airfoil.
Figure 10B:
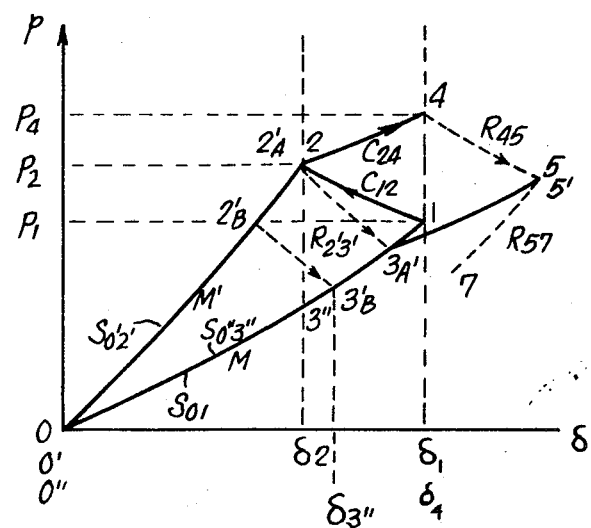

It must be emphasized that although the original wing shock is weakened, the lift force on the wind is not adversely effected but indeed may be enhanced by the application of such jet streams. This feature will now be explained with reference to FIGS. 10a and 10b. An anti-boom jet stream 50 generated parallel to ambient air stream 51 and at the same pressure but higher Mach number and at a vertical distance $h_j$ below the undersurface of a bi-convex type wing 52, is shown in FIG. 10a. When shock wave $S_{01}$ from the leading edge of wing 52 encounters the upper boundary 53 of this jet stream as a contact discontinuity, an interaction of the type described in connection with FIG. 8c results and a compression wave $C_{12}$ is reflected into the deflected ambient air stream 51 toward the wing undersurface 52a. Similarly, an expansion wave $R_{2'3'}$ is reflected into the deflected jet stream 50 when refracted shock $S_{0'\,2'}$ strikes the lower boundary 54 of this jet stream and emerges as shock $S_{0''\,3''}$ in the manner described in connection with FIG. 8a. This expansion wave $R_{2'\,3'}$ will penetrate the upper boundary 53 of the jet stream 50 and propagate into the ambient air stream 51 toward the wing undersurface 52a. Both the waves $C_{12}$ and $R_{2'\,3'}$ will be reflected from the wing undersurface 52a and a complicated wave interaction process follows. For clarity, FIG. 10a is a somewhat simplified depiction of the interaction process.

The thickness $h^1_j$ of the jet stream 50 is small compared with the wing chord, and the jet stream is located below the wing 52 a distance $h_j$ which is roughly ¼ of the wing chord. The wing 52 is set at a cruising angle of attack $\alpha$, for a speed of $M=2.7$, for example, but without taking the action of the high Mach number jet stream into consideration. The shock $S_{01}$ emanating from the leading edge of the wing would, if not intercepted by the anti-boom jet stream 50, propagate toward the ground and nearly catch up with and reinforce the nose shock, forming an asymptotic N-wave boom signature. In the presence of the high Mach number jet stream 50, however, the shock $S_{01}$ enters the stream as shock $S_{0''\,2''}$ and emerges as shock $S_{0''\,3''}$. This emerged shock $S_{0''\,3''}$ will then propagate the ground level to its place in the boom signature. The low Mach stream $M_E$ discussed in connection with FIG. 9a may be omitted.

Now, more particularly, in the manner shown in FIG. 9a the compression shock $C_{12}$ is reflected from the contact discontinuity 53 at point A and changes the nearly uniform flow in region 1 to state 2. In traveling over the lower surface 52a of the bi-convex type airfoil 52, the flow in region 1 is constantly affected by the expansion waves emanating from the curved lower surface of the airfoil as detailed in FIG. 7a. Thus, the compression wave $C_{12}$ is propagating into a field of gradually increasing Mach number, decreasing pressure and increasing flow velocity. The path of this weak shock wave $C_{12}$ therefore bends slightly toward the rear, as shown in FIG. 10a, and is incident on the wing undersurface 52a behind (downstream) the dividing Mach line where the tangent to the wing surface is essentially parallel to the flight direction in the undisturbed air flow (FIG. 7a). Since every streamline in flow region 2 is deflected by the shock wave $C_{12}$ toward the wing surface by a small angle $\delta_2$, wave $C_{12}$ will be reflected from the wing undersurface 52a as a compression (or weak shock) wave $C_{24}$ bringing the streamlines in region 4 locally parallel to the wing surface with a consequent rise in pressure. The pressure rise, $p_4 - p_1$, from region 1 to region 4 across the waves $C_{12}$ and $C_{24}$ is nearly twice the pressure rise across the wave $C_{12}$, i.e., $P_4 - P_1 \cong 2(P_2 - P_1)$ as seen in the shock polar in FIG. 10b. Thus, the pressure acting on the lower wing surface in region 4, is higher than what it would have been in the absence of the reflected wave $C_{12}$ from the high Mach number jet 50 by the amount $p_4 - p_1$. The wing surface in this region continues to curve upward, sending the aftward expansion waves shown in FIG. 7a into region 4. Some of these waves still catch up with the reflected wave $C_{24}$ and weaken it while the wave $C_{24}$ is propagating toward the upper contact discontinuity 53. The pressure changes in the series of events in various regions can be visualized with the help of the p-$\delta$ polar diagram, shown in FIG. 10b. While in the example considered in connection with FIG. 9a, the flow is uniform in each region, the expansion waves from the biconvex wing surface in this case complicate the details of the p-$\delta$ polar in FIG. 10b, although the general features remain the same.

The transmitted wave $S_{0'\,2'}$ changes the state of the jet stream 50 in region O' into state 2' which has the same pressure and deflection as state 2. The expansion waves originating from the lower bi-convex wing surface 52a in region 1, which do not catch up to shock $S_{01}$ in region 1, will cross the wave $C_{12}$ and the contact discontinuity 53. These expansion waves will gradually weaken the shock $S_{0'\,2'}$ from A to B. Thus, when $S_{0'\,2'}$ intersects the lower contact discontinuity 54, the stream 50 in region 2' near point B is at a somewhat lower pressure and smaller deflection. Accordingly, the expansion or rarefaction wave $R_{2'\,3'}$ originating from B will be weaker (as indicated in the p-$\delta$ polar diagram) than what it would be if the wing undersurface 52a near the leading edge were a straight wedge surface. This effect, of course, would be much more significant if the leading edge were somewhat rounded to accommodate for considerations of subsonic flight, as will be the case in an actual supersonic transport.

The expansion wave $R_{2'\,3'}$ originating from B, will cross the upper contact discontinuity 53 and pass into region 2, if the width $h^1_j$ of the jet stream is fairly small, as compared with $h_j$. Then, it will cross the compression wave $C_{24}$ into region 4. The sudden change of the slope of the lines for $R_{2'\,3'}$ in entering state 2 from state 2' is due to the sudden change of flow Mach number across the contact discontinuity 53. The curvature of wave $R_{2'\,3'}$ in region 2, and of wave $R_{45}$ in region 5, is due to the expansion waves from the wing surface. Eventually, the elements of the expansion wave $R_{45}$ will reach the wing undersurface 52a and be reflected from it as expansion wave $R_{57}$ in much the same manner as shock $C_{12}$ is reflected from the wing undersurface as shock $C_{24}$. Since an expansion wave spreads out as a fan during propagation, the reflection of the wave $R_{45}$ will be somewhat spread out on the wing surface. The pressure drop across $R_{2'\,3'}$ is larger than the pressure rise across $C_{12}$, i.e., $P_{2'} - P_{3'} > P_2 - P_1$. Thus, the strength of the shock $S_{0''\,3''}$ is weaker than that of $S_{01}$ and the complete reflection of $R_{45}$ from the wing undersurface 52a will bring the pressure in region 7 and beyond below what it would be in the absence of the high Mach number jet stream 50.

In view of the foregoing considerations, there are two different ways of maintaining the wing lift in the presence of the anti-boom jet: (1) the wing surface can be modified structurally around the region of reflection of $R_{45}$ or (2) the relative dimensions of $h^1_j$ and $h_j$ or other flow characteristics of the jet stream 50 may be adjusted so as to shift the expansion fans $R_{2'\,3'}$ and $R_{45}$ rearward to avoid the excessive underpressure that will occur in region 7. The necessary adjustments in any given situation can be readily determined by one skilled in the aerodynamic art. The ensuing interactions in regions 5,5',6',6'' and beyond, are then not of concern. The weak compression shock $C_{24}$ reflected from the wing undersurface 52a is constantly being reduced in strength by the expansion waves emanating from the wing surface downstream of the dividing Mach line. It is quite possible that $C_{24}$ may be annihilated before it reaches the contact discontinuity 53. In any case, if shock $C_{24}$ should eventually emerge as $C_{3''\ 5'}$ and as $C_{3''\ 6''}$, the latter shock $C_{3''\ 6''}$ will be very weak and since $C_{24}$ originates from the wing undersurface behind the dividing Mach line, the wave $C_{3''\ 6''}$ will not catch up to the wing shock $S_{0''\ 3''}$ to reinforce it.

Figure 7C:
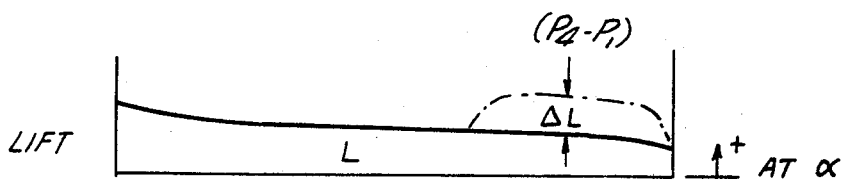
FIG. 7c is a plot illustrating the resultant lift force due to the pressure difference on the upper and lower surfaces of the wing shown in FIG. 7a and also illustrating the additional lift to be derived in accordance with the present invention.
Figure 7D:
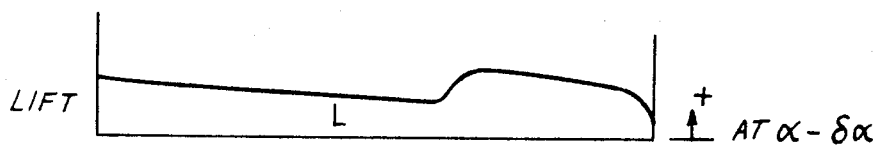
FIG. 7d is a plot as in FIG. 7c, illustrating the lift force distribution over the wing for a reduced angle of attack in accordance with the present invention.

The presence of the high Mach number jet stream is then seen to increase the lift force on the wing at the cruise angle of attack $\alpha$ producing a profile with increased lift $\Delta L = P_4 - P_1$ toward the rear of the wing as shown in FIG. 7c by increasing the pressure on the aftward half of the undersurface of the wing. To resume the normal lift required for level cruise, the angle of attack of the aircraft can be reduced slightly to $\alpha - \delta\alpha$ giving a lift profile on the wing as shown in FIG. 7d, and shifting the center of pressure of the lift force rearward. Accordingly, the shock $S_{01}$ at the wing leading edge will be reduced in strength, accompanied by a corresponding further reduction of the strength of shock $S_{0''\ 3''}$ Thus, the shock emerging from the interaction zone of the high Mach number jet stream 50 becomes even weaker than that which resulted with the wing at the former cruising angle of attack. This lift augmentation due to the direct interaction of the jet with the wing shock wave can contribute a significant portion to the overall lift on the aircraft and the indirect effect upon adjusting the trim to resume level cruise, may be comparable in magnitude to the contact discontinuity refraction in weakening the wing shock boom signature. Thus, it will be seen by those skilled in the art, that using the principles described and calculations in accordance with a given set of design parameters, the boom signature may be altered in the manner shown in FIGS. 3a–e, and FIGS. 4a–e to reduce the peak overpressure and the positive impulse.

ACHIEVING IMPROVED PERFORMANCE OF SUPERSONIC AIRCRAFT

If will also be seen by those skilled in the art that the interaction between the shock wave and the contact discontinuity described above, can be used to improve the performance and augment the control of various supersonic aircraft and other airborne vehicles, irrespective of sonic boom considerations. Since the thrust produced by the high Mach number jet stream is generated in the direction of the stream, but the lift is generated normal to the direction of the stream by means of the pressure reaction resulting from the shock wave and stream interaction, the stream does not impinge on the lifting surface. Therefore, unlike the known jet flap and shock compression devices, which operate on the dynamic head with attendant drag, the lift force derived from the present interaction does not detract from the reactive force of the jet in the stream direction, so that no drag is created. On the contrary, with the reflective wave $C_{12}$ incident to the rear of the dividing Mach line on the lifting surface, the incremental pressure increase provides a thrust component on the aft part of the lifting surface, decreasing the drag thereon and thereby increasing the lift-to-drag ratio. The jet stream-shock interaction is, moreover, a direct lift control device which can provide an almost instantaneous response, subject only to the time delay in establishing the supersonic jet flow which may be of the order of milliseconds, depending upon the means used. The lift increment then will immediately introduce curvature into the vehicle's trajectory without incremental drag, while the jet thrust helps to accelerate the vehicle. This is in sharp contrast with the results obtained from the conventional control by deflecting aerodynamic surfaces, which is comparatively slow in response and which produces incremental drag. Thus, the jet interacting device of the present invention will be ideal for fast response in emergency maneuvers and for supersonic transports equipped with anti-boom jet devices, such an emergency maneuvering capability will incur little penalty. The device mounted on either side of an aircraft may be used selectively for rapid pitch, roll and yaw control, as well as evasive maneuvering, and may be adapted for use on large missiles for similar purposes.

In fact, in view of its improved control capability, this jet interacting device may find wide application in connection with unmanned supersonic vehicles, such as drone aircraft, rockets and missiles, and may be implemented on either side of a shock wave-producing surface. It will generally be found superior to auxiliary rockets and other high temperature, reactive-type devices for its more precise controlling ability and its lack of heat which might damage the associated surface.

MEANS FOR PRODUCING THE ANTI-BOOM JET

It has been shown then, that the wave interaction produced by the high Mach number anti-boom jet stream can significantly modify the lift distribution on the wing surface and the flow field (the downwash field) behind the wing. The resultant shift of the center of pressure of the lift force rearward will cause a nose down moment on the aircraft, while the change in the downwash field may modify the effectiveness of the rear control surfaces. The drag on the airplane will also be somewhat reduced. However, a more thorough evaluation of all these complicated factors affecting the operation of the aircraft is best explained in connection with a description of a means for producing the active component of the present invention, the high speed Mach number jet stream. The details of the scheme for providing a means by which such a jet may be generated and incorporated into the aircraft as a whole, are of great importance, not only with regard to the technical efficiency, but also the economics of operation, of the aircraft and will now be discussed.

The preferred means for producing the anti-boom jet on any particular supersonic aircraft will very importantly depend on the aircraft's basic design, intended use and operating regime. Thus, if the basic design of the aircraft has not as yet been determined, such as is presently the case with the British and French second-generation SST "Super-Concorde," much of the penalty required for the incorporation of a boom reduction means may be avoided, compensated for or minimized by extensive design changes to take advantage of certain features offered by the means. In such event, the net penalty to be paid for boom reduction might be significantly lowered below that which may be necessary in the case where many of the design parameters are already essentially fixed leaving little margin for variation, as, for example, in the Boeing Company's prototype SST 2707-300. Further, the intended use of the aircraft, that is, whether for commercial or military purposes, will determine the weight and power penalties which are permissible. Also the operating environment, regime and even each specific mission is important in determining for what percentage of the flight time the anti-boom jet will be required. For example, the present commercial SST's with no special boom reduction equipment aboard, will only be permitted to cruise at supersonic speeds over large bodies of water and must travel subsonically over land areas and other places where the sonic booms would be found objectionable. Therefore, the anti-boom jet might only be needed for a comparatively short percentage of the flight time during a trans-Atlantic flight, while boom reduction would be required for the largest percentage of the time during a transcontinental flight.

This may be more fully appreciated by considering in greater detail the various flight phases and maneuvers which will be required in the operation of a supersonic transport. For example, we will consider the flight profile of the Boeing Co. prototype 2707-300 as currently planned by the manufacturers, in a flight from New York to Paris. The airplane, following lift-off from New York, will be required to climb subsonically at partial power and execute various maneuvers for noise abatement over a distance of about 70 nautical miles, until reaching an altitude of approximately 27,000 feet at low transonic speeds. At this point, the maximum augmented power is applied to accelerate through the transonic speeds and to continue to accelerate and climb supersonically, until reaching the cruise altitude of 60,000 feet, or more, which will be attained at a distance of approximately 270 nautical miles from lift-off. During this phase of the flight, the aircraft needs all of its available power to reach the cruising speed of about Mach 2.7, and the cruising altitude in the shortest possible time. The cruising speed will then be maintained at fractional engine power until the aircraft approaches a distance of about 230 miles from Paris. At this point, the aircraft will begin to descend and decelerate with further decrease in engine power, passing through the transonic range again at an altitude of about 40,000 feet and during which time it will have traveled about 140 nautical miles. During the entire supersonic cruise, the aircraft will be depositing a sonic boom track on the surface of the ocean. After passing through the transonic range, the aircraft will descend subsonically for 90 miles before landing in Paris. The entire flight will cover approximately 3,200 nautical miles which will require well over 300,000 pounds of fuel, a good portion of which is spent in achieving the cruise speed and altitude. On the return run, the supersonic transport may again fly over the ocean from Paris to New York supersonically, refuel at New York and then fly subsonically, to avoid creating a sonic boom, overland, for example, to San Francisco, a distance of approximately 2,250 nautical miles. For the shorter subsonic overland flight, the aircraft will need less fuel. The difference in weight may be taken advantage of by increasing the number of passengers carried. It will also be seen, however, that it is during this shorter overland portion of the route that the boom reduction is especially required, if the aircraft is to cruise supersonically, so that the reduction in the weight of the required fuel, which is approximately 40,000 to 50,000 pounds, could be taken advantage of to mount and operate the anti-boom jet-producing means on the aircraft instead of increasing the number of passengers. If boom reduction can be affected within the overall weight limitation of 40,000 pounds or so, for overland supersonic cruise, and this will be demonstrated later, then the increased aircraft utilization can be considered as having been achieved without significant adverse effects on the technical efficiency of operation of the aircraft.

In any event, no matter what particular supersonic aircraft is to be adapted with what particular boom reduction means, the various means will have some common characteristics. Since the high Mach number jet stream will be produced upstream of the wing shock wave, the jet-producing means will be located at or forward of the wing and mounted on the wing itself or at some point along the forward portion of the fuselage. It will be seen that the stagnation temperature of the jet stream should not be too high, although the jet is at a high Mach number, since the jet-producing means will be directed to pass the jet by the underside of the wing surface at fairly close distances. The jet stream will be created by means carried on board the aircraft having some associated power supply. While there are a great many physical and/or chemical processes that may be employed to create such a jet stream and the initial mass may be supplied from reservoirs on board the aircraft in particular cases, it will be extremely convenient to obtain a large part of the stream mass needed from the air of the ambient atmosphere. The momentum and energy of the jet, however, will be supplied for the most part by appropriate power sources on board the aircraft.

Any means using the ambient air in generating the anti-boom jet will consist basically of:
  i. an air inlet and diffusing means;
  ii. a means for increasing the stagnation pressure of the air, such as a compressor with a power unit; and
  iii. a nozzle means to expand the high pressure air to approximately the ambient pressure outside the aircraft while releasing it at a higher Mach number.

Ambient air will be admitted into the "anti-boom jet-producing means" through its "Inlet and diffusing means." The diffusing means will convert some of the kinetic energy of the incoming air to potential energy in the form of pressure. The air may be diffused to some subsonic velocities prior to being treated by the process to raise its stagnation pressure, for example, by flowing through a mechanical compressor or series of compressors, which will be powered by some power source, either directly or remotely. Such compressed air may then be delivered to a reservoir or settling chamber before being expanded through a converging-diverging nozzle to be discharged as a high Mach number jet stream. There are also many other varieties of processes, known to those skilled in the art, which can raise the stagnation pressure of a stream even at supersonic velocities. In many of these cases, the inlet air need not be diffused at all. In the latter cases, the physically confining exterior walls of the inlets may be replaced by other boundaries created by electromagnetic force fields and the like or a non-mechanistic nature. In any event, the main or key objective of the process is to increase the stagnation pressure of the air stream without an accompanying excessive increase of its stagnation temperature and any number of means for accomplishing this may be found suitable.

Figure 11:
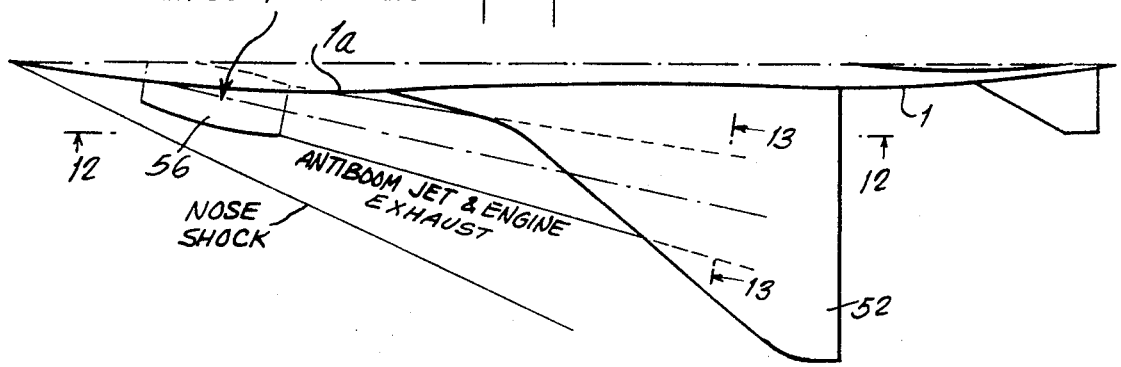
FIG. 11 is a diagrammatic view of anti-boom jet-producing system utilizing the main thrust-producing engines mounted forward on the aircraft and as incorporated on one side of a supersonic transport of the form of the Boeing Company prototype 2707-300.
Figure 12:
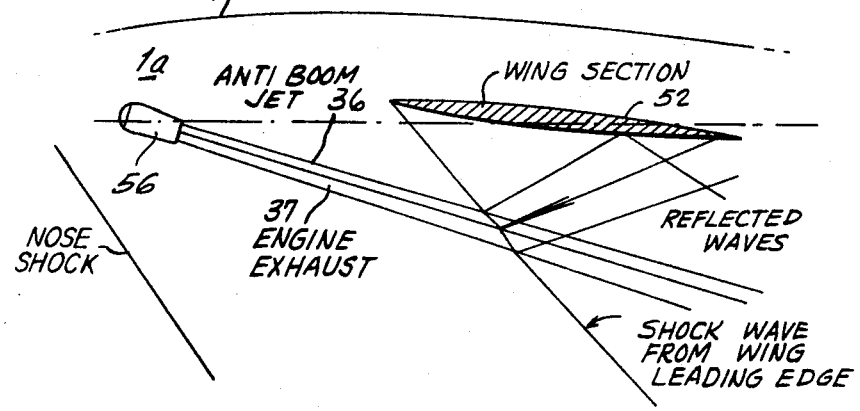
FIG. 12 is a partial side view taken along the lines 12—12 in FIG. 11, showing the interaction of the anti-boom jet and the engine exhaust with the shock wave from the wing leading edge.

Any of such means may be conveniently located, for example, in the lower half of the forward section of the nose of the aircraft to generate a high Mach number stream at a reasonable distance upstream from where the jet intercepts the wing shock, such as shown in FIGS. 11 and 12. The jet stream 36 may be directed at some small angle down from the chord of the wing 52 and at a small angle laterally away from the fuselage 1a, approximately along the flow direction behind the nose shock. The "nozzle" of the anti-boom jet-producing means is designed to expand the compressed air essentially correctly to the local ambient pressure which in this exit region may be slightly above or below the pressure in the ambient undisturbed atmosphere, since it may have been compressed by the nose shock and have expanded along the nose contour prior to encountering the anti-boom jet stream. Thus, the local air flow Mach number may be slightly different from the cruising Mach number of the aircraft and the local streams are diverging more or less conically with some variation along the wing span. The issuing jet from the nozzle exit will be designed not to cause major disturbances to the supersonic flow field, but under certain circumstances, as will sometimes be desirable, it may be designed to produce shock waves or expansion waves to strengthen or weaken the nose shock. For example, if the pressure of the jet is higher than that of the flow field, a shock wave will be produced, reinforcing the nose shock but if the pressure is lower, an expansion wave will be produced in the flow field which will weaken the nose shock. However, in order to produce these effects on the nose shock and use them to alter the boom signature, the issuing jet must be located near the aircraft nose forward of the nose dividing Mach line. In any event, the issuing jet, upon reaching the wing shock, will generally be in the form of a sheet of air passing, for example, about 20 feet below the undersurface of the wing and extending from an inboard position of about 20 feet from the vertical plane of symmetry of the aircraft to some outboard position along the wing span.

Along the nearly planar surface of the sheet, the faster moving anti-boom jet air mixes with the slower ambient air. The turbulent mixing along the jet boundary will lead to an essentially linear spread of the boundary at a shallow angle of the order of one degree. Over the distance to the wing shock, 100 feet or so, the jet boundary may have grown 1 to 2 feet laterally, but will still be well over 15 feet away from the aircraft's structural surfaces. Thus, the stagnation temperature of the issuing jet, while preferably relatively low, may be considerably above the stagnation temperature of the ambient flow without incurring the danger of overheating the structure of the aircraft.

If the sheet of anti-boom jet air is reasonably thick, the core of the jet stream when interacting with the wing leading edge shock, may still have the same velocity as the exit velocity of the issuing anti-boom jet. However, if the sheet is comparatively thin, the core may have disappeared and the jet will have more or less assumed the fully developed turbulent jet mixing profile. The mass flux in the anti-boom jet may then be substantially augmented from the ambient air. The center line velocity steadily decreases as the jet spreads further and engulfs more ambient air. The angular spread is small because the velocity difference between the two streams is not so significant as compared with the streamwise velocity of the jet stream.

The mass flux rate of air in the anti-boom jet is larger than that in the ambient air which will be approximately 20 lbs./sec. per square foot of area perpendicular to the airstream at the cruising altitude of the Boeing Co. prototype 2707-300. To cover the major lifting surface of the wing, the effective width of the anti-boom jet in the spanwise direction should be, for example, around 20 feet or more for each half wing of the 2707-300. If the effective thickness of the jet stream is about 2 feet, the air mass flux in the anti-boom jet will be almost 800 lbs./sec. Even with the jet mass augmented by a factor of 2 through mixing with ambient air, the issuing jet mass flux to be provided by the anti-boom jet means will at least be of the order of 400 lbs./sec. This is very substantial. During an hour of continuous operation, the anti-boom jet during overland cruise would deliver a total air mass of over a million pounds. Thus, it would seem to be necessary to take in air from the ambient and to compress it with the highest possible efficiency. The main engines of the aircraft which will be operating during cruise only at a fraction of their total capacity, would be ideally suited for the purpose. The opportunity to use this standby capacity will minimize the fixed weight of the hardware of the anti-boom jet means and the spendable weight of the energy source for its operation. Some other special air mass sources may be carried on board the aircraft for special reasons, but, in the case of supersonic transports at least, their total mass will probably only be a negligible fraction of the ambient air mass processed by the anti-boom jet means. The total excess capacity and the off-design operating efficiency of the main engines of supersonic transports, then, can be key factors in determining the economy of the operation of the anti-boom jet device.

USE OF THE G. E. CO. PROTOTYPE G.E. 4/J5P ENGINE IN PRODUCING THE ANTI-BOOM JET

In this regard, it is presently feasible, using existing technology, to create an anti-boom jet of sufficient power and mass flux to be used satisfactorily for boom reduction on the Boeing Co. prototype 2707-300, as will now be described.

According to data in the Jan. 5, 1970 issue of Aviation Week & Space Technology magazine, published by McGraw-Hill, New York, each of the four General Electric Co. prototype GE4/J5P engines intended for use on the 2707-300 are presently capable during cruise at 60,000 ft. and at Mach 2.7, and operating at ⅓ maximum reheat, of delivering 15,000 lbs. thrust with an air flux through the engine of approximately 280 lbs./sec. and an overall compression ratio of 12.5:1. The maximum air flux capacity through the engine compressor is 633 lbs./sec. The specific fuel consumption is 1.59 lbs. fuel/lb. thrust per hour. All four engines are installed in rear inboard locations under the wings in podded construction.

Figure 13:
FIG. 13 is a sectional view taken along the lines 13—13 in FIG. 11, illustrating the relationship of the anti-boom jet and engine exhaust with respect to the aircraft wing in supersonic cruise.

Now, let us consider moving these engines to locations forward on the fuselage ahead of the wing shock wave. The inlets of the engines will be adjusted so as to admit to each engine at cruise the maximum 633 lbs./sec. air and without making any serious attempt to optimize, let 280 lb./sec. of air pass through the combustors and turbines and be expanded to 6 psia at the turbine exit. The turbine under these conditions will generate more shaft power than that which is needed to compress the 280 lbs./sec. engine air for sustained operation so that the excess shaft work may be employed to compress the remaining 353 lbs./sec. of air to a pressure of about 55 psia and a temperature of about 1280° R. This 353 lbs./sec. air may then be led out of the compressor at the proper stage to a reservoir for anti-boom jet operation. Upon expanding correctly through a suitable nozzle to 1 psia, the air will reach a velocity of about 3,280 fps. The turbine exhaust at 6 psia may be reheated and then correctly expanded to 1 psia to reach the same exhaust velocity as the anti-boom jet air. The anti-boom jet air will be at 416° F while the engine exhaust air will be in the vicinity of 1390° R. These two sources of air can be arranged to form two parallel layers of air flow with the same velocity but quite different temperatures and Mach numbers. The resulting jets may be directed to move parallel to the ambient air which at Mach 2.7 is moving at about 2630 fps and at 393° R. The two jet streams are then directed toward the underside of the wing as shown in FIGS. 11 and 12. The flow situation in the vertical plane is essentially that sketched in FIG. 13 wherein the cool anti-boom jet 36 and the hot engine jet 37 are directed in such a way as to form two layers of air with the width of the anti-boom jet being substantially larger than that of the exhaust jet to protect the underside 52a of the wing 52 from becoming overheated.

Since the air jets under the half wings may be provided by two engines on each side, either individually or through a common reservoir and nozzle, the resulting air flux will be doubled. The issuing anti-boom jet air flux under each half wing then will be 706 lbs./sec. and the engine exhaust flux 560 lbs./sec. The exit area of the anti-boom jet will be approximately 30 ft.$^2$ and that of the engine jet approximately 80 ft.$^2$, a total of 110 ft.$^2$ compared with 65 ft.$^2$ of inlet area. As a result, some strengthening of the nose shock may then be expected.

The anti-boom jet delivers 8650 lbs. net thrust while the engine air flux delivers 6870 lbs. net thrust after subtracting the inlet momentum. The combination gives a total of 15,520 lbs. thrust, slightly more than the 15,000 lbs. of thrust required for cruise, thus permitting a margin for error due to the approximations in the calculations. The reheat in the after-burner with anti-boom jet operation is approximately 200° R larger than that under normal cruise. The anti-boom jet operation will thus increase the fuel consumption of overland cruise by about 15 percent as compared with the tolerable 30–40 percent. The excess fuel that need be burned during the entire overland cruise will be about 20,000 lbs.

Both the cold anti-boom jet and the hot engine exhaust mix with the ambient air while approaching the shock wave emanating from the wing leading edge, some 100 feet away on the Boeing Co. 2707-300 prototype. The transit time of the jet air is 1/30 sec. and the velocity difference is only 600 fps out of 3280 fps. Even with a fairly large turbulence intensity, the mixing rate in terms of ambient air mass flux engulfed in the jet is quite small. The angular spread of the outer edge of the mixing region is of the order of 1°.

To evaluate the effect of the degree of mixing, consider the two extreme cases:

*i*. The jet core maintaining the original exit velocity of 3280 fps. remains substantial upon impinging on the shock wave; or

*ii*. the asymptotic turbulent mixing profile is reached and the mean velocity and temperature of the equivalent uniform jet stream corresponds to complete mixing with one to one mass augmentation.

In the first case, based on calculations using the figures given previously in connection with the General Electric Co. GE4/J5P engine, the Mach number of the anti-boom jet will be $M'=3.28$ and that of the engine jet $M_E = 1.80$. (See FIG. 9a). The strength $\lambda_{01}$ of the wing shock $S_{01}$ as inferred from the 2707-300 existing design, is about 0.80. Then the shock strength $\lambda_{0'2'}$ in the anti-boom jet 36 will be 0.915. The reflected shock strength of $C_{12}$ is then 0.115, leading to a pressure rise of 0.23 in the rear half of the wing and increased lift $\Delta L$ as is sketched in FIG. 7c. The expansion fan $R_{2'3'}$ will be rather strong, bringing the shock strength $\lambda_{0E3E}$ to 0.652 in the engine jet 37. The Mach number in region 3E is 1.45. The shock $C_{3E4E}$ reflected from the point C turns the jet flow through a fairly large angle but does not bring about a correspondingly large pressure rise because of the low Mach number of the engine jet stream 37. The shock strength $\lambda_{0''4''}$ of the emerged shock $S_{0''4''}$ remains fairly low at 0.764. The sequence of complicated wave interactions reduces the strength of the leading edge wing shock $S_{01}$ from 0.80 to 0.764, a reduction of 0.036, or 4.5 percent. Note that this calculation ignores the increase of lift on the rear half of the wing.

Suppose now the pressure rise caused by waves $C_{12}$ and $C_{24}$ (FIG. 10a) covers ¼ of the total lifting area of the wing undersurface, 52a, then the gross lift may be increased by 7 percent. The angle of attack may then be reduced by 7 percent for the same lift. Accordingly, the total reduction of the emerged shock strength will amount to over 10 to 11 percent. Then, estimates based on equations (4) and (5) indicate that the wing shock will be shifted rearward and separated from the nose shock by more than 200 to 300 feet. This is sufficient to move the signature of the wing shock into the valley of the boom signature of the nose shock, as shown in FIGS. 3e and 4e.

In the second mixing case, the average Mach numbers are $M'= 3.08$ and $M_E= 2.00$. Similar calculations give the direct reduction of shock strength as 2.3 percent and the indirect reduction due to the increased lift as 3.2 percent, for a total of 5.5 percent. The downstream shift of the wing shock signature will still exceed 100 feet. Reduction of the peak boom overpressure from 2.5 units to 1.25 units may accordingly be expected. The cost will be 15 percent higher cruise specific fuel consumption, or, as indicated, roughly 20,000 lbs. additional fuel burned for operating the anti-boom jet during the entire cruise across the North American continent. The boom overpressure of the Boeing Co. 2707-300 in cruise may be reduced below the 1.5 psf. limit in supersonic ascent and descent and possibly to 1 psf. or below during cruise.

During supersonic descent, the thrust requirement of the engines will be decreased so that more engine capacity becomes available for anti-boom jet operation to meet the increased demand for boom reduction. This may be used to generate more compressed air or to generate the same amount of issuing anti-boom jet air but at higher Mach numbers. During supersonic acceleration, there is no surplus engine capacity and any diversion of captured air for anti-boom jet operation will result in serious loss of overall thrust, so that the anti-boom jet will not ordinarily be operated during this period. But, in the typical flight profile outlined previously, supersonic overland flight will be attempted only after attaining the cruise altitude, so the jet may not be necessary.

However, during supersonic acceleration for both over-water and over-land flights, the aircraft will be in a climb position. If the engines are located forward of the wing, the hot engine exhausts passing underneath the wing may tend to overheat the wing structure especially in the absence of the relatively cool anti-boom jet. It may then be desirable to have the anti-boom jet in operation during the climb, although the benefit to be derived from the reduction of boom overpressure may be minimal. The following will show how such can be done without incurring excessive penalty to the aircraft.

The air for the anti-boom jet operation during this period may be supplied from a source of high pressure liquid air, or the like, carried on board the aircraft. The main engines may operate at full power as planned. The liquid air can be used as a coolant at various stages of operation of the main engines, including the combustors and the turbine blades. It will then be heated to some appropriately high stagnation temperature after a pressure drop of perhaps a few hundred psia through the cooling passage. This air can then be expanded to give the anti-boom jet at a fairly high Mach number, delivering a thrust of the order of 140 lbs./lb.sec., that is, about 1/20 of the fuel specific impulse. This thrust will be generated much less economically using liquid air, of course, as compared to using fuel in a set of main engines having extra capacity. However, the anti-boom jet can considerably increase the climb angle and hence shorten the period of supersonic acceleration, so that the fuel required to keep the main engines in full power operation before climb to the cruise altitude will be proportionately reduced. Thus, the saving of the fuel weight due to reducing the climb time will offset the weight of the liquid air needed to operate the anti-boom jet during the climb period.

Also the more efficient cooling of the main engines with the liquid air not only increases the engine capacity but also the overall efficiency. The amount of improvement of the engine performance is difficult to estimate in general terms and although this benefit can be very significant, it will be ignored in the following estimate. Suppose now that 50 lb./sec. of liquid air is used as cooling air and is then discharged as the anti-boom jet. The additional thrust of about 7,000 lbs. will increase the thrust-to-weight ratio T/W by 0.01 with aircraft gross weight assumed as approximately that of the Boeing Co. 2707-300 prototype, 700,000 lbs. The improved lift process, as described in connection with FIG. 10a, derived from the anti-boom jet action can increase the lift-to-drag ratio $L/D$ by approximately 3 percent, so that $D/L$ will decrease by about 0.005. Then the average climb rate $\alpha C_c = T/W - D/L$, will be increased from 0.035 to 0.050. This means that the total time to climb from transonic flight at about 30,000 ft. to cruise flight at 60,000 ft. altitude, will be reduced from 600 seconds (10 min.) to 420 seconds. The fuel saved during the 180 seconds of full power operation of all the four engines will be about 24,000 lbs., probably sufficient to accommodate the weight incurred by carrying the 21,000 lbs. of liquid air that would be needed. The benefit that may result from higher engine capacity and efficiency due to more efficient cooling, which was ignored, will contribute more favorably to this estimate. It will also be seen that this scheme is an excellent method for improving the maneuverability of the aircraft as the anti-boom jet could be called upon to suddenly increase the climb rate in emergency situations.

Since the engines will now be equipped to use liquid air for engine cooling, it may be desirable to continue the use of some liquid air during cruise, which will permit appreciably higher turbine inlet temperatures, thus improving the engine efficiency during the critical cruise period.

Although the turbojet engine has been used as an example for the anti-boom jet-producing means, it will be seen by those skilled in the art that fanjet engines and other composite power plants which are designed to operate optimally while compressing secondary air for thrust augmentation, would be particularly suitable for use with the present invention.

It will be seen therefore, that feasible means exist for providing sufficient power and mass flow to create a satisfactory anti-boom jet by adaptation of the engines providing the main thrust for the aircraft and, if desired, in combination with a source of fluid under pressure carried on board the aircraft.

ARRANGEMENT OF THE ANTI-BOOM JET MEANS ON AN SST

Now, given the feasible means for providing the anti-boom jet, the arrangement of the means on a supersonic airframe will be considered further. It should be kept in mind during the following discussion, that in any complex structure having components which are critically interrelated, such as supersonic aircraft, any modification in one part may require adjustments and changes in various other parts of the structure, until an optimum balance of the various interacting factors is achieved to provide a workable unit. Such detailed design changes must necessarily be left to the engineering ability of those skilled in the art.

Of course, the preferred arrangement for the anti-boom jet-producing means is that already suggested (FIG. 11), of locating the main thrust-producing engines 56, which may be turbojet or turbofan engines, incorporating the anti-boom jet means, forward of the wing 52. This arrangement, however, will have significant effects on the structural and the performance aspects of the airplane in addition to modifying the aerodynamic characteristics, including the boom signature. Also, to locate all four engines in the front will inevitably call for rather extensive design changes in existing prototype SST aircraft which all now have the four engines on the rear inboard portion of the wings.

Figure 15:
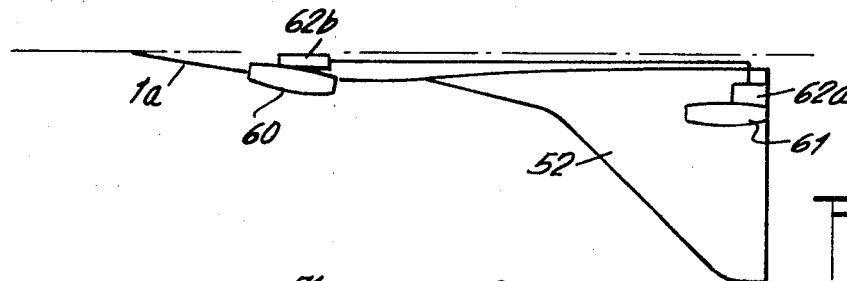
FIG. 15 is a diagrammatic view as in FIG. 11, showing an alternate form of anti-boom jet -producing system as arranged on one side of a supersonic transport, utilizing main thrust engines forward and aft.

A compromise between these two arrangements might be feasibly achieved by moving two engines to the front of the aircraft while leaving two engines on the wing to act as counterweights against the lifting force, providing bending relief as shown in FIG. 15. In view of the present design situation, it would seem feasible to provide an engine 60, on either side, in the front with sufficient compressor capacity to produce the anti-boom jet, but these engines alone may not be able to provide sufficient power. In such event, each of the wing-mounted engines 61 could be made to provide as much as 30,000 kw. of excess power when needed for the compression of anti-boom jet air. This power could be transferred efficiently in the form of electricity through a generator-motor combination 62a and 62b, respectively.

Figure 16:
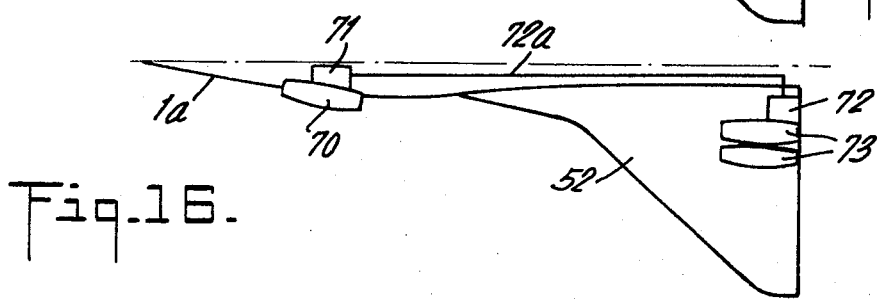
FIG. 16 is a diagrammatic view as in FIG. 11 showing another alternate form of anti-boom jet-producing system utilizing a separate unit powered by the main thrust-producing engines and as arranged on one side of a supersonic transport.

If none of the engines is to be moved to the front, then, as shown in FIG. 16, a separate inlet-diffusercompressor-nozzle means 70 may be added to the front of the aircraft and the compressors run by motors 71 powered by the generators 72 attached to the main jet engines 73 in the rear. In fact, the anti-boom jet-producing means 70–71 in the front might preferably be an integrated or a compact unit which can be installed and removed easily from the aircraft, in the manner of a cargo container, so as to permit a change-over from over-water to over-land flight and vice versa. The electric generator 72 and power transmission equipment 72a for the 50,000 to 100,000 kw. power required would also be a serious fixed weight penalty to the aircraft during over-water flight, when it would not be needed, so that removal of these units would be very desirable.

Figure 17:
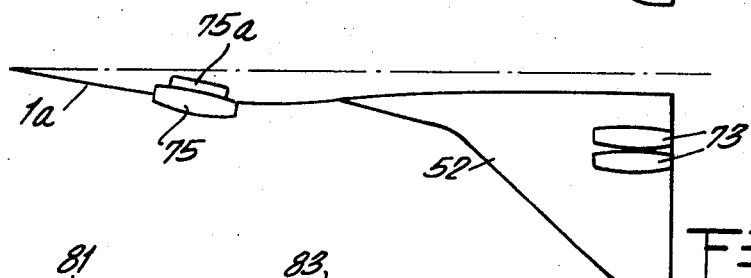
FIG. 17 is a diagrammatic view as in FIG. 11 showing an alternate removable form of anti-boom jet-producing system as arranged on one side of a supersonic transport, utilizing an additional jet engine.

In this regard, an additional pair of removable engines 75 may be used along with the four main thrust-producing jet engines 73 as shown in FIG. 17 and, although it would be costly, it would add considerable excess power to the aircraft with consequent performance advantages, and would probably require the least amount of changes in the designs of the existing supersonic transports for adaptation. Suitable mounting and demounting means 75a may be provided in the fuselage and may be made adjustable to direct the jets in the proper direction for effective operation on the wing shock wave.

Figure 18:
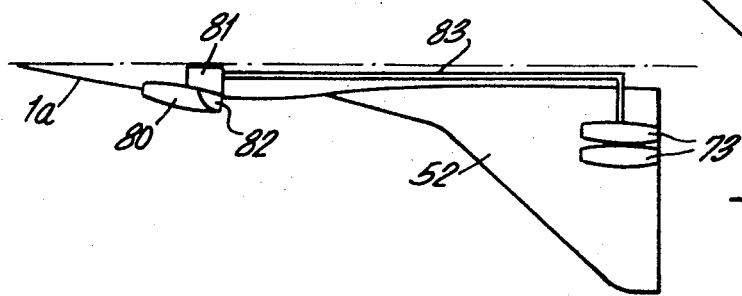
FIG. 18 is a diagrammatic view as in FIG. 11, showing a further alternate form of anti-boom jet-producing system, utilizing a separate unit receiving air ducted from the main thrust-producing engines and as incorporated on one side of a supersonic transport.

Alternatively, as shown in FIG. 18, the front unit 80 may be in such a form as to supply high pressure air from a reservoir 81 and nozzles 82, which reservoir is supplied with air by the main engines 73 in the rear. However, this would mean an extensive duct system 83 for leading the high pressure and relatively hot air from the engines through perhaps a few hundred feet within the aircraft. Such a duct system 83 could occupy a large mount of room in the aircraft interior, the fixed weight penalty could be large and the loss of stagnation pressure and energy of the compressed air during the transfer through the duct could also be serious. Although the total air mass flux to be transferred may be reduced by higher compression, which would be limited by the engine capacity, the resulting higher air pressure and temperature would need a stronger duct system and result in greater unit losses. Nevertheless, such a system might prove desirable in certain forms of supersonic aircraft, especially when used for example, in combination with liquid air carried on board.

Figure 19:
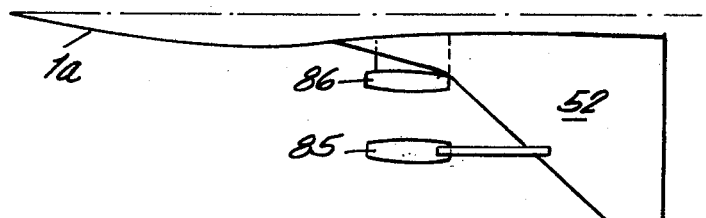
FIG. 19 is a diagrammatic view as in FIG. 11, showing another alternate form of anti-boom jet-producing system as arranged on one side and one wing of a supersonic transport.

Other arrangements may also prove desirable, such as mounting an engine 85 on the wing or on the fuselage below the wing (86), but forward of the wing shock wave, as shown in FIG. 19. It will again be appreciated that among the arrangements described above and indeed among the many other possibilities, the preferable configuration will depend very much on the particular aircraft structure, the engines, the mission nature and duration and optimizing the compromises in the various arrangements, combinations and design options available.

ARRANGEMENT OF THE ANTI-BOOM JETS MEANS ON THE BOEING CO. PROTOTYPE 2707-300

In this regard, the adaptation of the Boeing prototype 2707-300 SST will be considered as a particular example. Structurally, an outstanding feature of the 2707-300 SST is its large tail. This may be to provide for the nose up moment when all the slat and flap surfaces are down in low speed operation and when the center of pressure of the lift force has shifted rearward in supersonic cruise. The nose up trim penalizes slightly the lift-drag ratio in the critical cruise operation. The four engines hung to the rear of the wing at inboard positions provide some bending relief in decreasing the wing structural weight. This rearward position of the wing-engine assembly may not be the most desirable aerodynamically, however, and contributes to the rearward position of the center of gravity of the aircraft, the shortness of the moment arm of the tail assembly and thus to the increase of the size and weight of the tail structure. Now the consequence of incorporating the anti-boom jet devices previously described will be examined.

The scheme which imposes the least fixed weight penalty to the aircraft is the preferred arrangement wherein all four engines are moved to a forward position on the aircraft to serve as the anti-boom jet means as well as the main thrust-producing means. However, some possibly adverse factors resulting from such a modification are:

i. the hot exhaust streams from the engines in their forward positions pose a danger of overheating the aircraft structure especially when the aircraft is in a climb or a maneuver;

ii. the loss of bending relief of the engines on the wings may increase the required wing structure weight;

iii. the forward engine assembly will increase substantially the transverse sectional area of the fuselage near the nose, leading to increased nose drag and a stronger nose shock in the boom signature;

iv there may be too much nose up moment provided by the inclined engine thrust requiring a larger tail to provide a balancing nose down moment.

Of these factors, the latter three would seem not to be of major concern. For example, the increase in wing weight due to the loss of bending relief may be offset by the possible reduction in the weight of the tail assembly and by the advantages gained from an aerodynamically cleaner wing surface. The nose drag caused by the engine inlets and nacelles must be compared with the elimination of the drag associated with the current podded construction under the wing. If two of the engines are nearly accommodated within the underside of the fuselage, some drag reduction may result, although it may be offset by some inlet problems. The slight strengthening of the nose shock which will result may indeed be advantageous from the point of view of boom reduction, as previously explained in connection with FIGS. 3e and 4e. If too much nose up moment is provided by the engine thrust requiring a large tail to provide a balancing nose down moment, such a modification will not cause as much penalty on the cruise lift-to-drag ratio as that due to a nose-up trim. Also, the forward shift of the engines brings the center of gravity of the aircraft forward, increasing the effectiveness of the tail control surface. Thus, as in most aerodynamic designing, the effects resulting from various changes may be offset and balanced by other modifications, until an optimum comprise configuration is determined, as will be readily seen by those skilled in the art.

The first or aircraft surface heating factor, however, poses a real danger, especially when the aircraft is in climb, or other maneuvers at full augmented power. As previously mentioned, the hot engine exhaust jets are directed along approximately the flow direction behind the nose shock wave at an angle of the order of a few degrees below the plane of the aircraft, and a few degrees laterally away from the vertical plane of symmetry. Reasonable estimates of the deflection of the jet centerline, the spread due to turbulent diffusion, and the convective distortions of the contour lines indicate the margin of safety throughout the standard flight profile of the supersonic transport may be small. It is difficult to estimate very accurately. The small margin of safety is, hence, of serious concern and may call for protective measures, especially in view of certain maneuvers that the aircraft may have to perform under special circumstances. Protective coatings and special cooling provisions in vulnerable areas may be called for and a number of suitable protective schemes are currently available.

Figure 14:
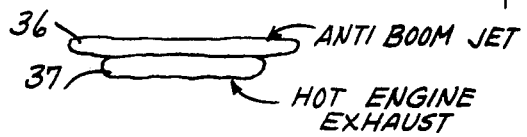
FIG. 14 is a sectional view as in FIG. 13, illustrating the relationship between the anti-boom jet, the engine exhaust and the wing during aircraft climb.
Figure 14:
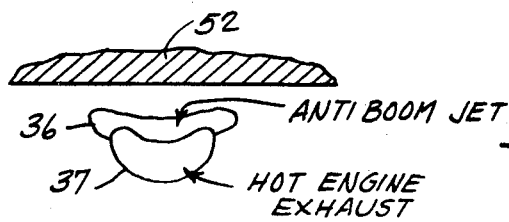
Figure 20:
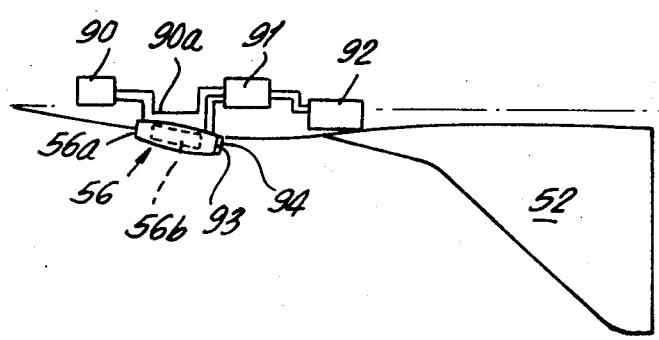
FIG. 20 is a diagrammatic view showing in greater detail the anti-boom jet-producing means shown in FIG. 11.

On the other hand, the anti-boom jet itself is at a substantially lower stagnation temperature and higher dynamic head than the engine exhaust and is generally above the engine exhaust and below the wind structure (see FIG. 13) so that, while operating, the anti-boom jet 36 contributes significantly in preventing the overheating of the aircraft structure by the hot engine exhaust 37. It is of particular value during climb when the jet and the exhaust centerlines are deflected toward the wind and the two streams merge in a manner such as shown in FIG. 14. The capacity of the overheating protection of the jet 36 may be augmented by mixing special constituents, such as liquid $NH_3$, $CO_2$, $H_2O$ and other materials with appropriate melting and boiling points, with liquid air in generating the anti-boom jet. More particularly, the latent heat capacity of such ingredients may be taken advantage of in the following manner as shown in FIG. 20. As previously suggested, liquid air from a source 90 may be conducted through a passage 90a to indirectly cool the engines 56 and stored at a high stagnation pressure and temperature in an appropriate reservoir 91 along with ambient air which is taken in at the inlets 56a of the engines 56 and compressed by the engine compressors 56b. A suitable ingredient such as water vapor, drawn for example, from the ballast tanks 92, can be injected into the reservoir 91 and will be converted by the high temperatures to steam. Although the stagnation temperature of this high pressure air mixture may be well over 1,000° R, when the air is expanded through nozzle 93 to produce the high Mach number jet 36, the static temperature will be reduced drastically. The drop in temperature condenses the steam which thereby helps to expand the air by providing heat for the expansion. The resulting water droplets may be further converted into droplets of ice during the expansion process and will be carried along and will disperse in the low temperature anti-boom jet air. These condensed particles and droplets in the anti-boom jet will then absorb the heat from the engines' exhaust 37 below, largely in the form of latent heat of vaporization, and thus keep the anti-boom jet 36 at a reasonable temperature. This is important in maintaining the high Mach number of the anti-boom jet and for protecting the underside of the wing. This additional protective cooling function of the anti-boom jet may be a good reason to call for the operation of the anti-boom jet during supersonic climb, although the increase in the overland mileage achieved may not be significant.

It will also be appreciated that the anti-boom jet may be formed in layers interspersed between layers of the engine exhaust in various configurations of high and low Mach number streams as long as the high Mach number streams produce compression waves in their interactions with the wing shock wave which will maintain the requisite level of lift on the underside of the wing. Appropriate nozzles 93 and 94 for the high Mach number and low Mach number jets 36 and 37, respectively, may be provided for directing and dividing the jets as desired.

In summary then, it will be seen that a method and means has been presented for significantly reducing the sonic boom due to supersonic transports to a level which may be regarded as acceptable during overland flight. Accordingly, the boom signature of the wing is displaced aftwardly with respect to the nose boom signature by means of a high Mach number jet which interacts with the wing shock wave, decreasing it in strength and therefore speed of propagation, while maintaining the lift on the aircraft. Indeed an added advantage and capability of the use of the high Mach number jet is the improvement of performance factors of the aircraft, such as the lift-to-drag ratio, providing increased efficiency and maneuverability which affords greater safety in operation. In addition to suggestions for the design of new supersonic aircraft equipped with anti-boom means, a particular feasible means for producing the anti-boom jet using existing technology, has been described along with particular alternatives for the manner of incorporating it on existing supersonic transports.

It will also be appreciated by those skilled in the art that, although the method and means of the present invention have been particularly described in connection with weakening the wing shock wave on a supersonic transport, the principles and operating effects achieved may be applied to any lifting surface on any airborne vehicle, such as parts of the fuselage on aircraft and various shock wave producing surfaces on rockets and missiles.

What is claimed is:

1. Method of improving the performance of supersonic aircraft, comprising the steps of:
   a. creating a contact discontinuity adjacent a lifting surface of the aircraft by producing a fluid stream having a Mach number greater than that of its ambient supersonic flow; and
   b. directing the stream such that the contact discontinuity interacts from upstream with a leading shock wave from said lifting surface in a region from which a majority of shock waves reflected from the interaction will strike the adjacent side of the surface aft of its dividing Mach line, thereby increasing the lifting force thereon.

2. Method as in claim 1, including the step of reducing the angle of attach of said lifting surface in response to the increased lifting force thereon.

3. Method of reducing the sonic boom from a supersonic aircraft, comprising the steps of:
   a. creating a contact discontinuity below a major lifting surface of the aircraft by producing a fluid stream having a Mach number greater than the Mach number of its ambient supersonic flow; and
   b. directing said fluid stream at a region aft and below the leading edge of said major lifting surface, to cause the major lift shock wave propagating therefrom to propagate into and interact with the contact discontinuity beneath the lifting surface such that compression waves resulting from the interaction will strike the underside of the lifting surface, thereby weakening said shock wave and altering the boom signature while maintaining lift.

4. Method as in claim 3, wherein said major lifting surface is an aircraft wing and said contact discontinuity is created below the wing leading edge a distance of approximately ¼ of the wing chord.

5. Method as in claim 3, including directing the fluid stream such that the compression waves reflected from the interaction will strike the underside of the major lifting surface aft of its dividing Mach line.

6. Method as in claim 5, including directing said fluid stream such that shock waves reflected from the interaction of the contact discontinuity and said shock wave from the wing leading edge strike the aft portion of the underside of the wing, increasing the lift force thereon; and reducing the angle of attach of the lifting surface in response to the increased lifting force produced by the compression waves to further weaken the wing shock wave.

7. Method as in claim 3, including producing a second fluid stream having a Mach number lower than that of its ambient supersonic flow and directing said second stream toward said shock wave beneath said lifting surface.

8. Method as in claim 2, including directing said greater Mach number stream between said lifting surface and said lower Mach number stream.

9. Method as in claim 8, wherein the greater Mach number stream includes air from a source of liquid air.

10. Method as in claim 8, wherein said greater Mach number stream contains a cooling agent selected from the group consisting of $NH_3$, $CO_2$ and $H_2O$.

11. Method as in claim 3, wherein said fluid stream is produced by
c. capturing ambient air;
d. increasing the stagnation pressure of the captured air; and
releasing said air as a jet of fluid.

12. Method as in claim 11 wherein said air is released from a location adjacent and downstream from the aircraft nose, and upstream of the lower nose contour dividing Mach line to alter the nose shock strength.

13. Method as in claim 12, wherein said air is released at a pressure above the static pressure of the surrounding flow to strengthen the nose shock wave, thereby altering the boom signature.

14. Method as in claim 12, wherein said air is released at a pressure below the static pressure of the surrounding flow to weaken the nose shock wave, thereby altering the boom signature.

15. Method of improving the performance of supersonic aircraft, comprising the steps of:
a. creating a contact discontinuity adjacent a lifting surface of the aircraft by producing a fluid stream having a Mach number lower than that of its ambient supersonic flow; and
b. directing the stream such that the contact discontinuity interacts from upstream with a leading shock wave from said lifting surface in a region from which a majority of expansion waves reflected from the interaction will strike the adjacent side of the surface forward of its dividing Mach line, thereby decreasing the drag force thereon.

16. Method of decreasing the overpressure and positive impulse of an aircraft sonic boom signature, comprising creating a contact discontinuity in the near field of the aircraft for preventing the leading wing shock wave from catching the leading nose shock during propagation thereby shifting the wing shock signature and the nose shock signature with respect to each other in the far field, so that the peak overpressure of the wing shock signature will rise in the valley of the nose shock signature at ground level 17. Method as in claim 16, wherein the wing shock signature is shifted by weakening the wing shock to decrease its propagation velocity.

18. Method as in claim 16, wherein the nose shock signature is shifted by strengthening the nose shock to increase its propagation velocity.

19. Means for improving the performance of a supersonic aircraft comprising:
a. means for producing a fluid stream having Mach number greater than that of its ambient supersonic flow;
b. means for mounting said fluid stream producing means on the aircraft; and
c. means on the aircraft for directing said fluid stream to interact from upstream with a shock wave propagating adjacent a lifting surface of the aircraft in such manner that shock waves reflected from the interaction will strike the adjacent side of the lifting surface aft of its dividing Mach line.

20. Means as in claim 19, wherein the means for producing the fluid stream includes a source of liquid air.

21. Means as in claim 19 wherein the means for producing the fluid stream comprises:
d. inlet means for taking in ambient air;
e. means for increasing the stagnation pressure of the air taken in; and
f. nozzle means for expanding the increased stagnation pressure air for release into said fluid stream.

22. Means as in claim 19, wherein the lifting surface is an aircraft wing and said fluid stream producing means is mounted adjacent and downstream from the aircraft nose and upstream of the lower nose contour dividing Mach line to alter the nose shock strength.

23. Means as in claim 19, wherein the means for producing the fluid stream comprises a main thrust-producing engine of the aircraft.

24. Means as in claim 23, wherein the means for producing the fluid stream comprises:
i. a source of liquid air;
ii. means for conducting liquid air from said source to cool said main thrust-producing engine;
iii. means for receiving said air after cooling said thrust-producing engine and collecting it at a high stagnation pressure; and
iv. means for expanding and releasing said high stagnation pressure air into said fluid stream.

25. Means for reducing the sonic boom from a supersonic aircraft comprising:
a. means for producing a fluid stream having a Mach number greater than that of its ambient supersonic flow;
b. means for mounting said fluid stream-producing means on the aircraft; and
c. means on the aircraft for directing said fluid stream to interact from upstream with the leading shock wave propagating beneath a major lifting surface of the aircraft, in a region aft and below the leading edge of said lifting surface from which the compression waves resulting from the interaction will strike the underside of the lifting surface, to weaken and decrease the propagational velocity of the shock wave, thereby altering the aircraft boom signature while maintaining the lifting force on the lifting surface.

26. Means as in claim 25, wherein the means for producing the greater Mach number stream comprises a main thrust-producing engine of the aircraft.

27. Means as in claim 25, wherein the means for producing the fluid stream comprises a turbofan engine.

28. Means as in claim 25, wherein the lifting surface is an aftwardly positioned aircraft wing and said fluid stream producing means is mounted adjacent and downstream from the aircraft nose and upstream of the lower nose contour dividing Mach line to alter the nose shock strength.

29. Means as in claim 25, including:
   d. means on the aircraft for producing a fluid stream having a Mach number lower than that of its ambient supersonic flow; and
   e. means for directing said lower Mach number stream immediately below the greater Mach number stream.

30. Means as in claim 29, wherein the means for producing the low Mach number fluid stream comprises a main thrust-producing engine of the aircraft.

31. Means as in claim 25, wherein the means for producing the greater Mach number stream comprises a source of liquid air.

32. Means as in claim 31, comprising means for conducting said liquid air from said source to cool a main thrust-producing engine of said aircraft.

33. Means as in claim 25, wherein the means for producing the fluid stream comprises:
   d. inlet means for taking in ambient air;
   e. means for increasing the stagnation pressure of the air taken in; and
   f. nozzle means for expanding the increased stagnation pressure air for release as said fluid stream.

34. Means as in claim 33, comprising means for introducing a cooling agent into said stagnation pressure-increasing means.

35. Means as in claim 25, wherein the means for producing the fluid stream comprises a turbojet engine.

36. Means as in claim 35, wherein said turbojet engine comprises:
   i. a source of liquid air;
   ii. means for conducting liquid air from said source to cool said turbojet engine;
   iii. means for receiving said air after cooling said turbojet engine and collecting it at a high stagnation pressure; and
   iv. means for expanding and releasing said high stagnation pressure air into said fluid stream.

37. Means as in claim 36, wherein said releasing means is located above the exhaust stream of said turbojet engine.

38. Supersonic aircraft comprising:
   a. means mounted on the aircraft for producing a jet of fluid with a higher Mach number than that of its ambient supersonic flow;
   b. lift-producing means; and
   c. means directing said fluid jet under said lift-producing means to interact from upstream with the lift shock wave beneath the lift-producing means.

39. Aircraft as in claim 38, wherein the means for producing the fluid jet is a turbofan engine.

40. Aircraft as in claim 38, wherein the lift-producing means is the aircraft wing and said jet-producing means is mounted adjacent and downstream from the aircraft nose and upstream of the lower nose contour dividing Mach line to alter the nose shock strength.

41. Aircraft as in claim 38, wherein the means for producing said fluid jet comprises a source of liquid air.

42. Aircraft as in claim 41, wherein said higher Mach number jet-producing means comprises a main thrust-producing engine of said aircraft and means for conducting said liquid air from said source to cool said main thrust-producing engine.

43. Aircraft as in claim 38, comprising means mounted on the aircraft for producing a jet of fluid with a lower Mach number than that of its ambient supersonic flow.

44. Aircraft as in claim 43, wherein said lower Mach number jet-producing means comprises a turbojet engine mounted forward of said lift shock wave, the exhaust from while engine comprises a low Mach number jet and interacts with said lift shock wave.

45. Aircraft as in claim 44, wherein said higher Mach number jet-producing means comprises said turbojet engine.

46. Aircraft as in claim 38, wherein the means for producing the fluid jet comprises:
   d. inlet means for taking in ambient air;
   e. means for increasing the stagnation pressure of the air taken in; and
   f. nozzle means for expanding the increased stagnation pressure air for release into said fluid jet.

47. Aircraft as in claim 46, comprising means for introducing a cooling agent into said stagnation pressure-increasing means.

48. Aircraft as in claim 46, wherein said stagnation pressure-increasing means comprises a compressor.

49. Aircraft as in claim 48, wherein said compressor is powered by a main thrust-producing engine of the aircraft.

50. Aircraft as in claim 48, comprising means for conducting ambient air taken in by a main thrust-producing engine of said aircraft to said compressor.

* * * * *